(12) United States Patent  
Krajca et al.

(10) Patent No.: US 9,327,470 B1  
(45) Date of Patent: May 3, 2016

(54) VARIABLE-RADIUS LAMINATED RADIUS FILLER AND SYSTEM AND METHOD FOR MANUFACTURING SAME

(71) Applicant: The Boeing Company, Chicago, IL (US)

(72) Inventors: Scott Edward Krajca, Seattle, WA (US); Joseph L. Sweetin, Edmonds, WA (US); Christopher G. Harris, Auburn, WA (US); William T. Kline, Seattle, WA (US); Gabriel Z. Forston, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 13/705,800

(22) Filed: Dec. 5, 2012

(51) Int. Cl.
| | | |
|---|---|---|
| *B32B 5/12* | (2006.01) | |
| *B32B 3/08* | (2006.01) | |
| *B26D 1/00* | (2006.01) | |
| *B32B 37/14* | (2006.01) | |
| *B29C 70/54* | (2006.01) | |
| *B29C 70/34* | (2006.01) | |
| *B29D 99/00* | (2010.01) | |

(52) U.S. Cl.
CPC ... *B32B 3/08* (2013.01); *B26D 1/00* (2013.01); *B32B 37/14* (2013.01); *B29C 70/342* (2013.01); *B29C 70/545* (2013.01); *B29D 99/0003* (2013.01); *Y10T 428/24058* (2015.01); *Y10T 428/24074* (2015.01); *Y10T 428/24116* (2015.01); *Y10T 428/24124* (2015.01); *Y10T 428/24174* (2015.01); *Y10T 428/24289* (2015.01)

(58) Field of Classification Search
CPC ...... B29C 70/545; B29C 70/342; B32B 5/12; Y10T 428/24058; Y10T 428/24289; Y10T 428/24124; Y10T 428/24174; Y10T 428/24116; Y10T 428/24074
USPC .............. 128/78, 107, 112, 133, 119; 428/78, 428/107, 112, 133, 119
See application file for complete search history.

(56) References Cited

U.S. PATENT DOCUMENTS

| | | | | |
|---|---|---|---|---|
| 4,789,594 A | * | 12/1988 | Stawski | B26D 1/02 156/222 |
| 5,939,007 A | * | 8/1999 | Iszczyszyn et al. | 264/258 |

(Continued)

FOREIGN PATENT DOCUMENTS

WO   WO 2014073102 A1 * 5/2014

OTHER PUBLICATIONS

Botting et al., Effect of Ply-Drop Configuration on Delamination Strength of Tapered Composite Structures, AIIA Journal, vol. 34, Aug. 1996.*

(Continued)

*Primary Examiner* — Aaron Austin  
*Assistant Examiner* — Michael Zhang

(57) ABSTRACT

A variable-radius laminated composite radius filler may include a base portion, a keyway portion, and a tip portion. The base portion may be formed of a plurality of variable width composite plies defining a variable cross-sectional shape of the base portion. The keyway portion may be stacked on the base portion and may be formed of a plurality of substantially constant width composite plies defining a substantially constant cross-sectional shape of the keyway portion. The tip portion may be stacked on the keyway portion and may be formed of composite plies.

41 Claims, 21 Drawing Sheets

(56) References Cited

U.S. PATENT DOCUMENTS

| | | | |
|---|---|---|---|
| 6,562,436 B2* | 5/2003 | George et al. | 428/105 |
| 7,380,753 B2* | 6/2008 | Kairouz | 244/123.1 |
| 2002/0031641 A1 | 3/2002 | George et al. | |
| 2008/0111024 A1* | 5/2008 | Lee et al. | 244/121 |
| 2008/0145615 A1* | 6/2008 | Jacobsen et al. | 428/156 |
| 2009/0041974 A1* | 2/2009 | Gleason et al. | 428/113 |
| 2009/0317587 A1 | 12/2009 | Deobald et al. | |
| 2010/0170988 A1* | 7/2010 | Meyer et al. | 244/120 |
| 2011/0143081 A1* | 6/2011 | Fritz et al. | 428/77 |
| 2012/0074265 A1 | 3/2012 | Hallander et al. | |
| 2014/0034236 A1* | 2/2014 | Guzman | B29C 70/52 156/324 |

OTHER PUBLICATIONS

Blom et al., A Theoretical Model to Study the Influence of Tow-drop Areas on the stiffness and strength of Variable-Stiffness Laminates, Journal of Composite Materials, vol. 00, Jan. 2009.*

Dalgarno et al. "Thermal Fatigue Cracking of an IM7/5250-4 Cross Ply Laminate: Experimental and Analytical Observations," Journal of Composite Materials, vol. 43, No. 23/2009, 2699-2715.*

* cited by examiner

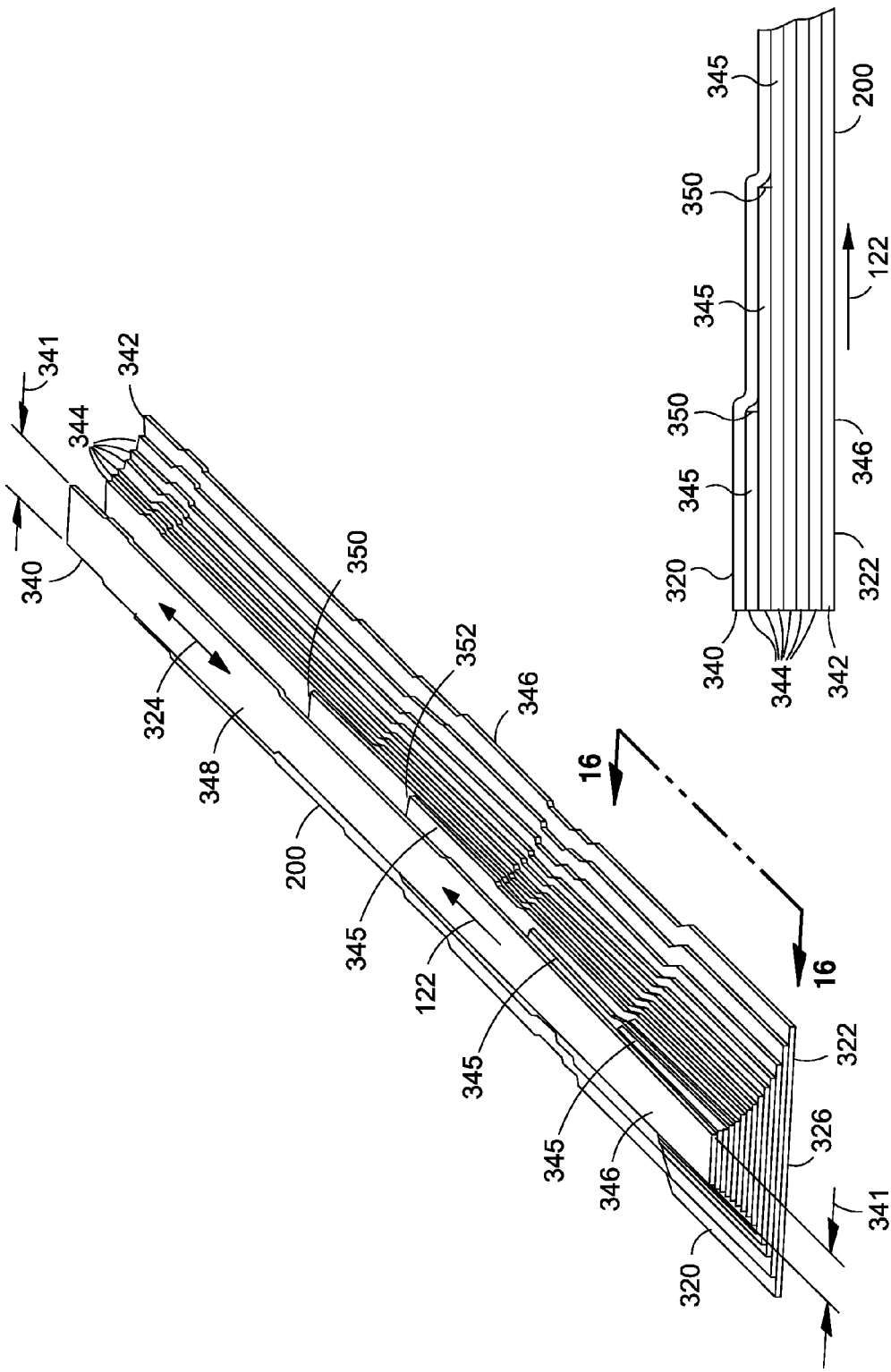

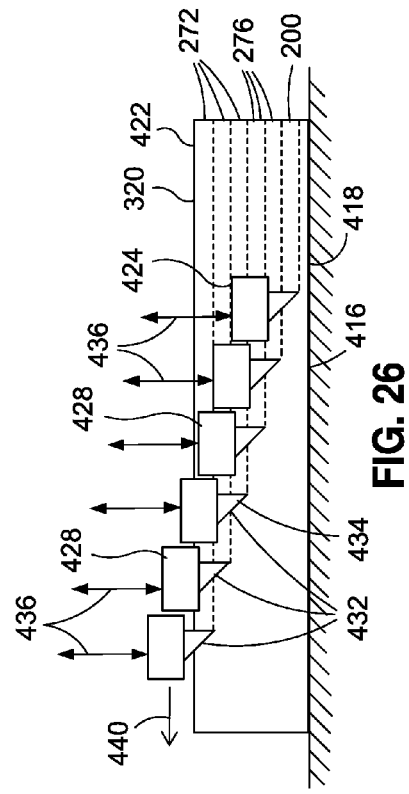
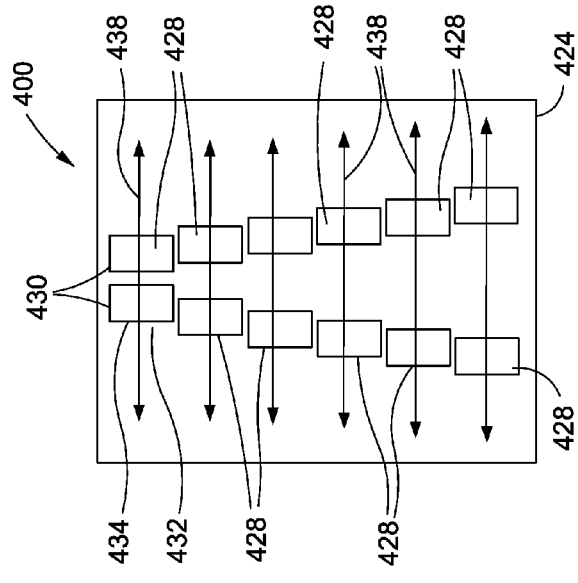
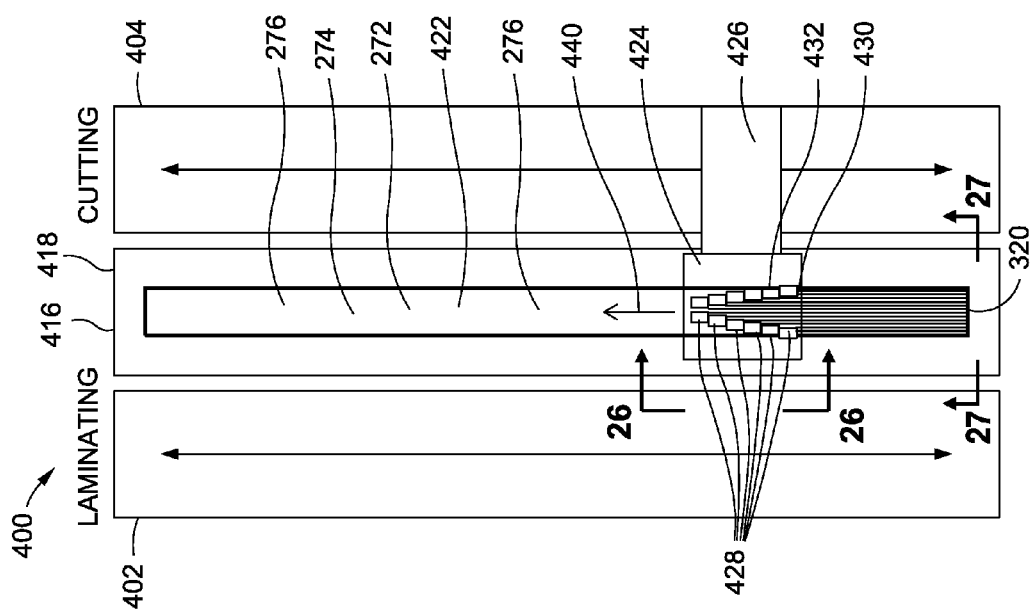

VARIABLE-RADIUS LAMINATED RADIUS FILLER AND SYSTEM AND METHOD FOR MANUFACTURING SAME

FIELD

The present disclosure relates generally to composite structures and, more particularly, to composite radius fillers for composite structures, and methods for manufacturing the same.

BACKGROUND

Composite structures are used in a wide variety of applications due to their high strength-to-weight ratio, corrosion resistance, and other favorable properties. In aircraft construction, composites are used in increasing quantities to form the fuselage, wings, horizontal and vertical stabilizer, and other components. For example, the horizontal stabilizer of an aircraft may be formed of composite skin panels co-bonded to internal composite structures such as composite stiffeners or spars. The composite spars may extend from the root to the tip of the horizontal stabilizer and may generally taper in thickness along a spanwise direction to improve the stiffness characteristics of the horizontal stabilizer and reduce weight. Composite spars may also include localized increases in the composite thickness such as where the spar attaches to other structures or components.

Composite stiffeners or spars may be provided in a variety of cross-sectional shapes. For example, a composite spar or stiffener may be formed in an I-beam shape by bonding together the vertical webs of two "C" composite channels in back-to-back arrangement. Each one of the "C" channels may have horizontal flanges extending outwardly from the upper and lower ends of the web. Each horizontal flange may transition into the web at a radiused web-flange transition. When the "C" channels are joined back-to-back to form the I-beam shape, the radiused web-flange transitions result in a lengthwise notch along the upper and lower ends of the I-beam. The lengthwise notches may be referred to as radius filler regions or noodle regions. To improve the strength, stiffness, and durability of a composite structure, radius filler regions may be filled with radius fillers or noodles formed of composite material.

Unfortunately, existing radius fillers suffer from several drawbacks that detract from their utility. For example, existing radius fillers may exhibit cracking due to residual stress that may occur during the manufacturing process. In addition, certain radius fillers may result in relatively low pull-off strength at the bond between the I-beam and the skin panel. Furthermore, radius fillers formed of unidirectional fibers may prevent non-destructive inspection (NDI) of the inner radii at the web-flange transitions in the I-beam. For example, the geometry of the radius fillers may prevent inspection of the inner radii using conventional acoustic inspection methods due to adverse effects on acoustic transmissions. Further in this regard, localized changes in the composite thickness along the length of the I-beam may result in variations in the contour of the inner radii of the I-beam which may complicate acoustic inspection of the inner radii.

As can be seen, there exists a need in the art for a radius filler that minimizes cracking during the composite manufacturing process and which provides favorable pull-off strength. Furthermore, there exists a need in the art for a radius filler that improves the inspectability of the inner radius of a composite structure. Preferably, the radius filler can be manufactured in a low-cost and relatively rapid manner with a minimal amount of touch labor.

SUMMARY

The above-noted needs associated with radius fillers for composite structures are specifically addressed and alleviated by the present disclosure which provides a variable-radius laminated composite radius filler that may include a base portion, a keyway portion, and a tip portion. The base portion may be formed of a plurality of variable width composite plies defining a variable cross-sectional shape of the base portion. The keyway portion may be stacked on the base portion and may be formed of a plurality of substantially constant width composite plies defining a substantially constant cross-sectional shape of the keyway portion. The tip portion may be stacked on the keyway portion and may be formed of composite plies.

Also disclosed is a method of forming a radius filler. The method may include providing an upper portion having substantially constant width composite plies. The method may further include providing a base portion as a stack of variable width composite plies. In addition, the method may include stacking the upper portion onto the base portion to form a radius filler stack, and applying heat and pressure to the radius filler stack to form a final radius filler having a variable cross-sectional shape.

In a further embodiment, disclosed is a system for manufacturing a composite radius filler. The system may include a cutting head having a plurality of cutters arranged in a side-by-side configuration. The cutters may be movable along a lengthwise direction of a laminated stack of composite plies. The cutters may have blades that may be positionable at different heights for cutting the laminated stack into a base portion having a stepped pyramidal cross-sectional shape. The cutters may be individually movable along a lateral direction for cutting the composite plies into variable cross-sectional shapes.

Also disclosed is a method of manufacturing a composite radius filler including the step of assembling a laminated stack of composite plies. The method may further include cutting, using a cutting head, the laminated stack along a lengthwise direction in a manner forming a base portion having a stepped pyramidal cross-sectional shape. In addition, the method may include forming the composite plies in a variable width when cutting the laminated stack along the lengthwise direction.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 15 is a perspective view of an embodiment of a base portion having a continuous top layer overlapping the terminating ends of the mid layers;

FIG. 16 is a side view of the base portion of FIG. 15 illustrating the continuous top layer overlapping the terminating mid layers;

FIG. 24 is a schematic top view of an embodiment of a laminating station and a cutting station for laminating and cutting a laminated stack of composite plies into a base portion of a radius filler stack;

FIG. 25 is schematic top view of an embodiment of a cutting head for cutting the laminated stack into a stepped pyramidal cross sectional shape;

FIG. 26 is a side view of the cutting head cutting through layers of composite plies in the laminated stack;

DETAILED DESCRIPTION

Figure 1:
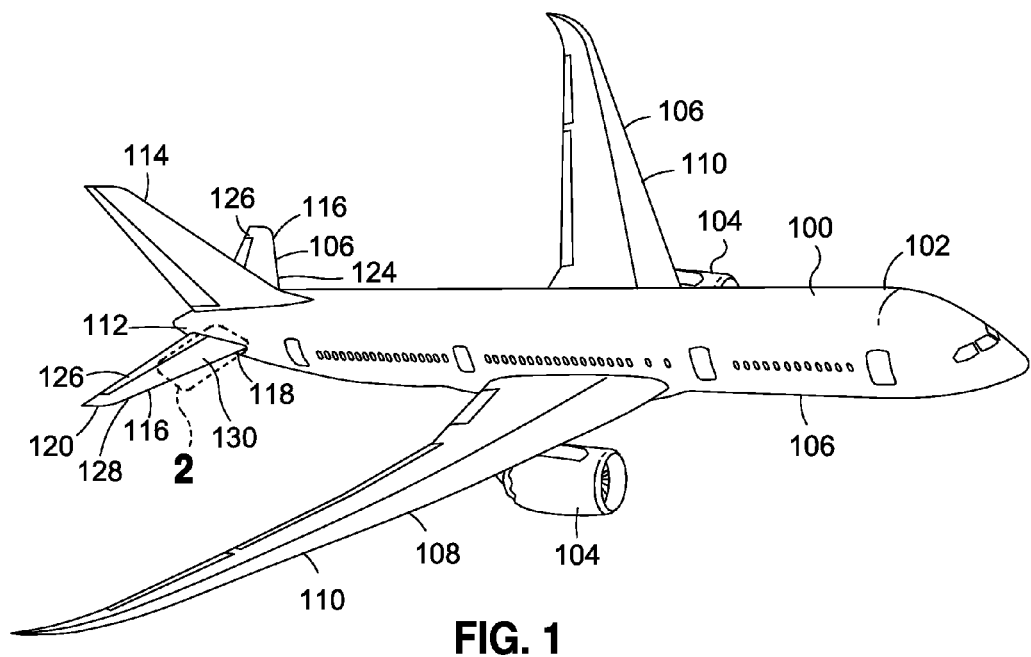
FIG. 1 is a perspective view of an aircraft.

Referring now to the drawings wherein the showings are for purposes of illustrating preferred and various embodiments of the disclosure, shown in FIG. 1 is a perspective view of an aircraft 100 having a fuselage 102 extending from a forward end of the aircraft 100 to an aft end of the aircraft 100. The aft end may include an empennage 112 having one or more tail surfaces for directional control of the aircraft 100 such as a vertical stabilizer 114 and a pair of horizontal stabilizers 116. The aircraft 100 may further include a pair of wings 110 extending outwardly from the fuselage 102 and one or more propulsion units 104 that may be mounted to the wings 110. The fuselage 102, the wings 110, the vertical stabilizer 114, the horizontal stabilizers 116, and other aircraft components may be formed as composite structures 106.

Figure 2:
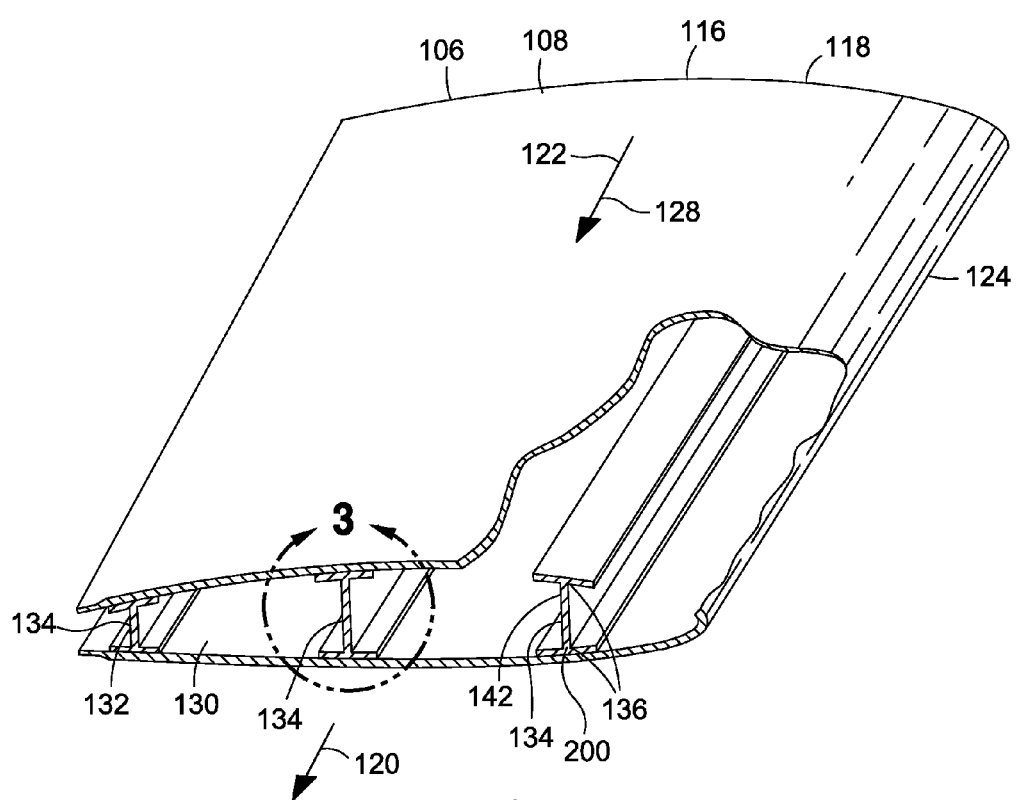
FIG. 2 is a perspective view of a horizontal stabilizer taken along line 2 of FIG. 1.

Referring to FIG. 2 shown is a perspective cutaway view of a portion of a horizontal stabilizer 116 of the aircraft 100 of FIG. 1. The horizontal stabilizer 116 may have a stabilizer leading edge 124 and a stabilizer trailing edge 126 (FIG. 1) and may extend along an outboard direction 122 from a stabilizer root 118 to a stabilizer tip 120. As indicated above, the horizontal stabilizer 116 may be formed of composite skin panels 130 that may be co-bonded to one or more composite stiffeners or spars 132. The composite stiffeners or spars 132 may have a generally tapered or reduced thickness along a spanwise direction 128 of the horizontal stabilizer 116. In addition, the composite spars 132 or stiffeners 134 may include localized changes in the composite thickness (FIG. 20) along the length of the spars 132 or stiffeners.

In FIG. 2, the composite spar 132 or stiffener 134 is provided in an I-beam 142 shape although the composite stiffener 134 may be provided in a variety of cross-sectional shapes. The composite stiffener 134 may include horizontal flanges 148 that transition from the web 146 at a radiused web-flange transition 150 as indicated above. Each one of the web-flange transition 150 defines a stiffener outer radius 138 and a stiffener inner radius 136. Each composite stiffener 134 may further include a base laminate 152 that may enclose a radius filler region 140 on upper and lower ends of the composite stiffener. The radius filler region 140 may extend along a lengthwise direction of the composite stiffener 134.

Advantageously, the present disclosure provides a laminated composite radius filler 200 having a variable cross-sectional shape 322 (e.g., a generally reducing cross-sectional area) along an outboard direction 122 of a composite stiffener 134 to accommodate a tapering or reducing thickness of the composite stiffener 134. In addition, the variable cross-sectional shape 322 radius filler 200 disclosed herein has opposing sides that are contoured to accommodate localized increases and decreases 218 in the thickness of the composites stiffener 134 along a spanwise direction 128, as described in greater detail below. By forming the radius filler 200 in a variable cross-sectional shape 322, the stiffener inner radius 136 may be generally constant along a length thereof which may significantly improve the inspectability of the stiffener inner radius 136 relative to the significant amount of time and complexity required for inspecting a stiffener inner radius that varies (not shown) along a lengthwise direction.

Advantageously, a substantially constant stiffener inner radius 136 may allow for forming the stiffener tooling with a constant radius which may significantly reduce tooling costs relative to the cost of tooling having variable radii. Furthermore, the variable cross-sectional shape laminated composite radius filler 200 disclosed herein may advantageously reduce cracking during the manufacturing process relative to existing radius fillers such as unidirectional radius fillers. In addition, the variable cross-sectional shape 322 laminated composite radius filler 200 disclosed herein may result in improved pull-off strength at the bond between the composite stiffener 134 and a skin panel 130.

Figure 3:
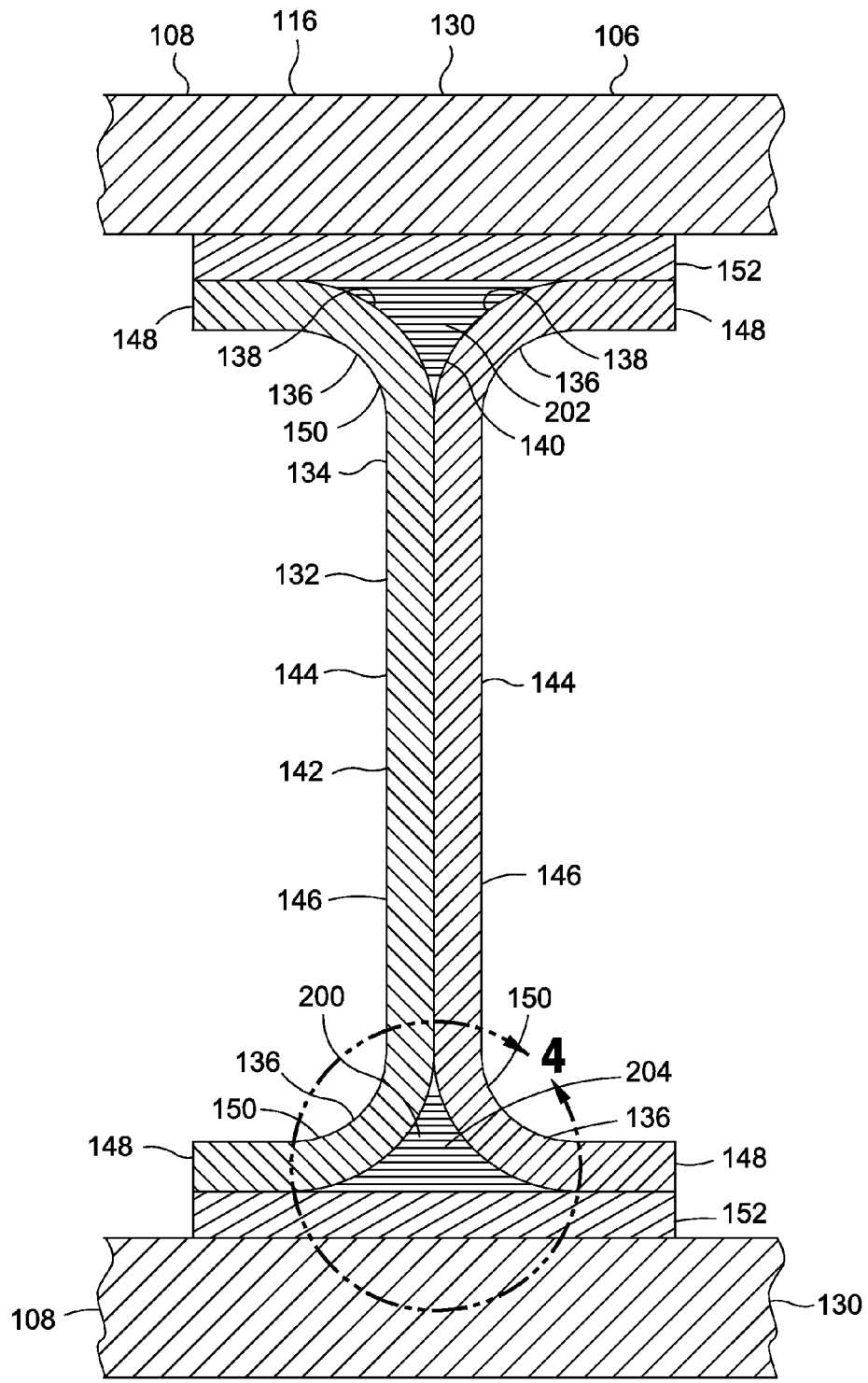
FIG. 3 is a side view of a composite stiffener bonded to upper and lower skin panels and taken along line 3 of FIG. 2.

Referring to FIG. 3, shown is I-beam 142 composite stiffener 134 prior to co-bonding to upper and lower skin panels 130. The composite stiffener 134 is comprised of a pair of channels 144 positioned in back-to-back relationship to form the I-beam 142 shape. Each channel 144 includes a web 146 having horizontal flanges 148 at the upper and lower ends of the channel 144. As indicated above, the radiused web-flange transitions in each channel 144 result in a lengthwise notch or radius filler region 140 at the upper and lower ends of the I-beam 142. The radius filler regions 140 are filled with the variable cross-sectional shape 322 laminated upper radius filler 202 and lower radius filler 204. Advantageously, each radius filler 202, 204 is formed with a variable cross-sectional shape 322 that matches the changing contour of the outer stiffener 134 radii in the radius filler region 140 along a length of the stiffener. In this manner, the composite structure 106 advantageously has a substantially constant stiffener inner radius 136 along a lengthwise direction.

Figure 4:
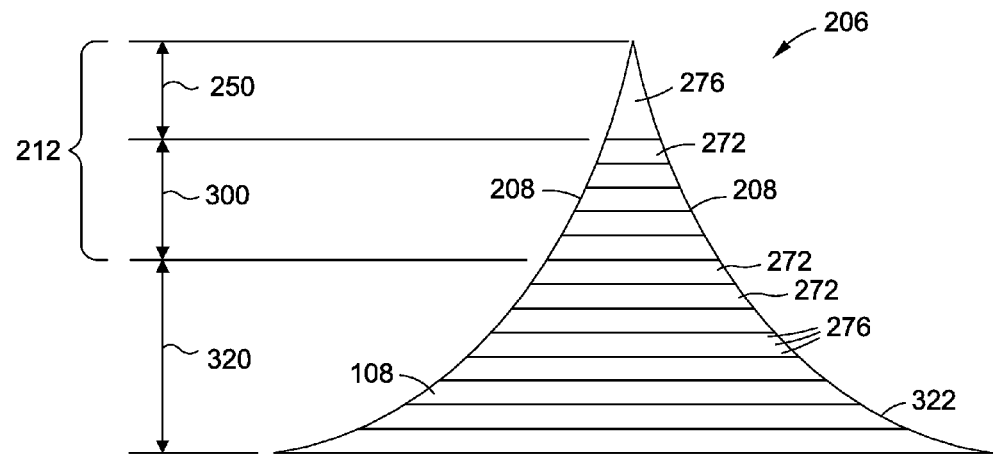
FIG. 4 is a side view of a final radius filler taken along line 4 of FIG. 3.

Referring to FIG. 4, shown is an end view of a final radius filler 206 after co-bonding or co-curing with the composite stiffener 134. The final radius filler 206 has opposing radius filler sides 208. Each one of the radius filler sides 208 may have a variable radius along a lengthwise direction. In the final profile shape, the radius filler sides 208 are preferably contoured complementary to the radius filler region 140 of a composite structure 106 such as a composite stiffener 134.

The final profile shape may be applied to the radius filler sides 208 using a forming die 230 as described below.

Figure 5:
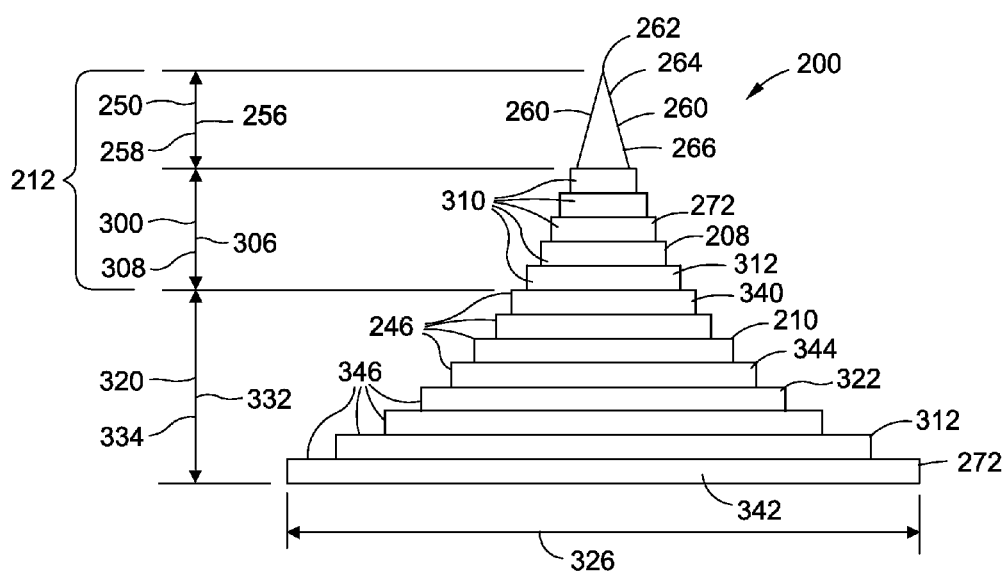
FIG. 5 is an embodiment of a radius filler stack from which the final radius filler of FIG. 4 may be formed.

Referring to FIG. 5, each radius filler 200 may be formed of a laminated stack 422 of composite plies 276. The composite plies 276 may comprise pre-preg composite plies 276 such as carbon fiber reinforced plastic (CFRP) plies. The base portion 320 may be formed as a plurality of variable width composite plies 346 defining a variable cross-sectional shape 322 of the base portion 320. As described below, the variable cross-sectional shape 322 of the base portion 320 may extend along a lengthwise direction 324 or along at least a portion of the length of the base portion 320. The radius filler 200 may also include an upper portion 212 stacked on top of the base portion 320. The upper portion 212 may comprise a tip portion 250 and a keyway portion 300. The upper portion 212 may advantageously have a substantially constant cross-sectional shape along a lengthwise direction which may simplify manufacturing of the radius filler 200.

Figure 6:
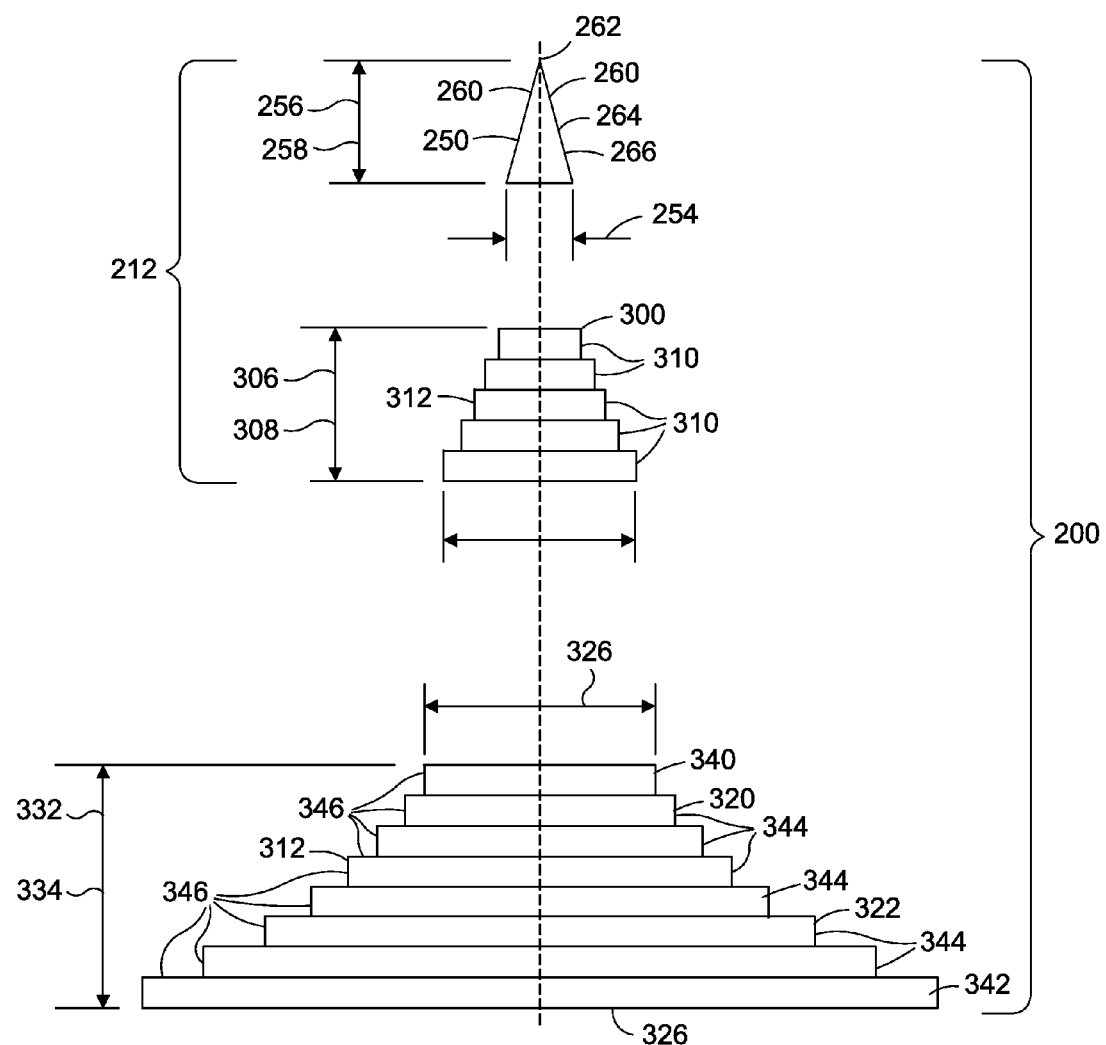
FIG. 6 is an exploded side view of an embodiment of a radius filler stack comprised of a tip portion, a keyway portion, and a base portion.

Referring to FIG. 6, shown is an exploded view of a radius filler 200 wherein the upper portion 212 is shown comprised of a separate tip portion 250 and a separate keyway portion 300. However, as indicated above, the tip portion 250 and the keyway portion 300 may be formed as a unitary upper portion 212 to simplify manufacturing. The tip portion 250 may be comprised of a plurality of substantially constant width composite plies 310 defined by a tip portion width 254. The tip portion 250 may have a triangular cross-sectional shape 264 with tip portion sides 260 terminating at a tip portion apex 262. The tip portion 250 may have a substantially constant cross-sectional area along a lengthwise direction. However, although not shown, the tip portion may have a variable cross-sectional shape. For example, the triangular cross-sectional shape 264 may vary along the lengthwise direction. In an embodiment, the tip portion width 254 may vary in correspondence with the changing radii of the radius filler region 140 (FIG. 2) of a composite structure 106.

Although not shown, the tip portion 250 may be configured such that at a location of a relatively large radius in the radius filler region 140 (e.g., at the root 118 of the horizontal stabilizer 116—FIG. 1), the tip portion 250 may have a narrower tip portion width 254 and a taller tip portion height 256 relative to a location of a smaller radius in the radius filler region 140 (e.g., at the tip 120 of the horizontal stabilizer 116—FIG. 1) where the tip portion 250 may have a wider tip portion width 254 and a shorter tip portion height 256. However, the tip portion 250 may also be configured with a substantially constant tip portion height 256 and/or a substantially constant tip portion width 254 along a lengthwise direction 252 of the tip portion 250. Furthermore, in an embodiment not shown, the tip portion 250 may be eliminated from the upper portion 212 where the volume of the radius filler region 140 filled by the tip portion 250 is relatively small, such that the upper portion may be comprised solely of the keyway portion 300.

In FIG. 6, the keyway portion 300 may have a substantially constant cross-sectional shape along the lengthwise direction 302. The keyway portion 300 may also be formed of a plurality of substantially constant width composite plies 310 defined by a keyway portion width 304. In an embodiment, the keyway portion 300 may have a stepped pyramidal cross-sectional shape 312 along the lengthwise direction 302. However, the keyway portion 300 may have angled sides and (not shown) such that the keyway portion 300 may have a trapezoidal shape (not shown). The keyway portion height 306 may be a constant height 308 along a lengthwise direction 302. The upper portion 212 may be stacked onto the base portion 320 to form a radius filler stack 210.

By configuring the upper portion with a substantially constant cross-sectional area and/or a substantially constant cross-sectional shape along the lengthwise direction, the cost of manufacturing radius fillers 200 may be significantly reduced by eliminating the need to build a relatively narrow, uniquely-tailored, upper portion 212 (e.g., a uniquely-tailored tip portion 250 and a uniquely-tailored keyway portion 300) for each radius filler region in a composite structure 106. In this regard, a common upper portion 212 may be paired with different base portion 320 configurations for use in different composite stiffeners such as the different composite stiffener 134 I-beams 142 of the horizontal stabilizer 116 of FIG. 2. In an embodiment, the upper portion 212 (e.g., a tip portion 250 and a keyway portion 300) may be built in batches at relatively low cost for pre-kitting with base portions 320. Costs may further be reduced by purchasing pre-manufactured upper portions 212 from an outside supplier.

Figure 7:
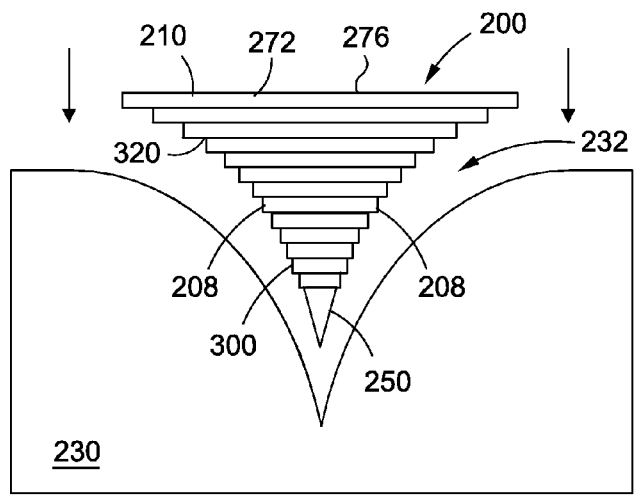
FIG. 7 is a schematic illustration of an inverted radius filler stack prior to installation in a forming die.

FIG. 7 is a schematic illustration of an inverted radius filler stack 210 prior to installation in a forming die 230. The forming die 230 may have a die cavity 232 that may substantially duplicate the radius filler region 140 of a composite structure 106. In this regard, the die cavity 232 may be contoured complementary to the changing stiffener outer radii 138 of the radius filler region 140 of a composite structure 106. In FIG. 6, the radius filler stack 210 may be sized and configured to provide a design overfill volume (not shown) that is a larger than the volume of the die cavity 232 (FIGS. 7-9) and/or the volume of a corresponding radius filler region 140 of a composite structure 106. In this regard, the cross-sectional area of the radius filler 200 may be larger than the cross-sectional area of the radius filler region 140. In a further embodiment, the die cavity 232 may be sized and configured to provide a tooling overfill volume (not shown) that may be larger than the volume of the corresponding radius filler region 140. By sizing and configuring the radius filler 200 and the die cavity 232 in an overfill condition, pull-off strength may be improved relative to a radius filler having a volume that is substantially equivalent to the volume of the radius filler region or the die cavity.

Figure 8:
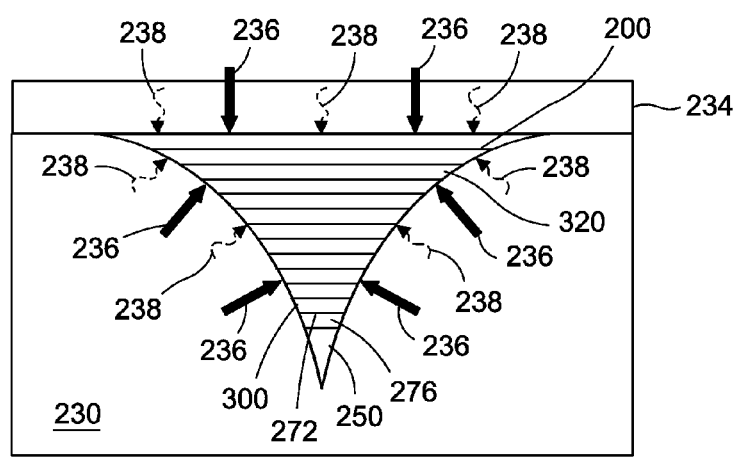
FIG. 8 is a schematic illustration of the application of heat and pressure to the radius filler stack within the forming die.

FIG. 8 shows the application of heat 238 and pressure 236 to the radius filler stack 210 within the forming die 230. A pressure plate 234 may be applied over the base portion 320. Heat 238 and pressure 236 may be applied to the radius filler stack 210 in a predetermined heat-pressure cycle to debulk and/or consolidate the radius filler 200. The heat 238 may reduce the viscosity of the resin in the pre-preg composite plies 276 allowing the resin to soften so that the radius filler 200 can conform to the cross-sectional shape of the die cavity 232.

Figure 9:
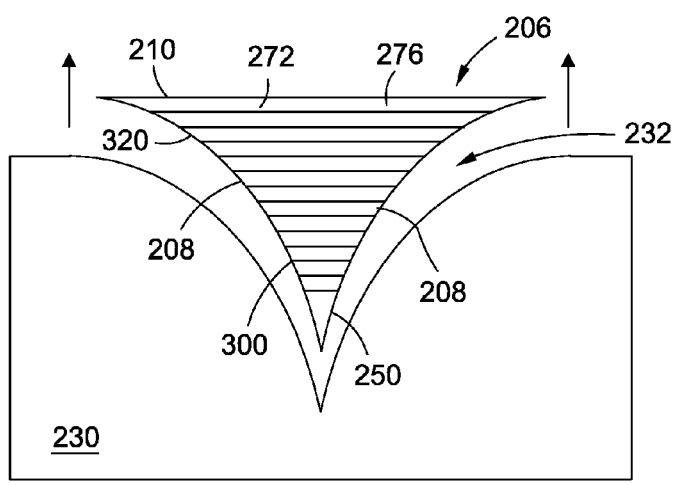
FIG. 9 is a schematic illustration of the final radius filler after removal from the forming die.

FIG. 9 illustrates the removal of a final radius filler 206 from the forming die 230. The final radius filler 206 may be in a green state wherein the resin in the composite plies 276 is uncured. The final radius filler 206 may be installed into a radius filler region 140 of a composite structure 106 for final co-curing and/or co-bonding with the composite structure 106 and/or skin panels 130.

Figure 10:
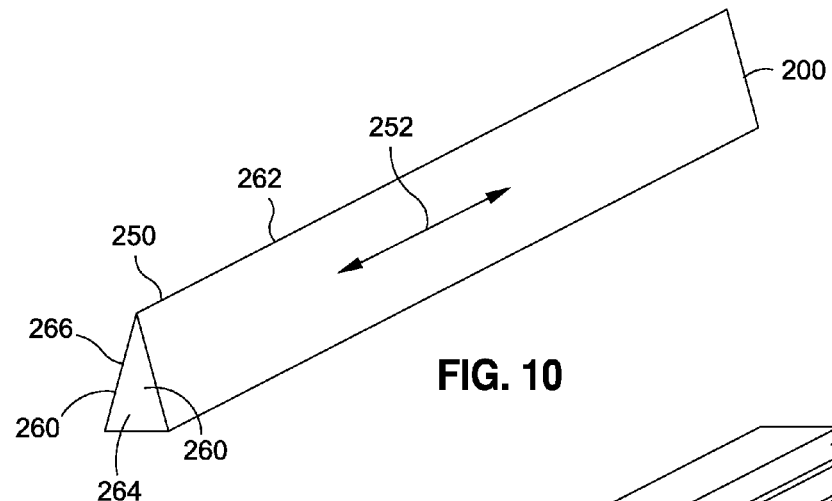
FIG. 10 is a perspective illustration of an embodiment of a tip portion having a substantially constant cross-sectional shape.

FIG. 10 is a perspective view of an embodiment of a tip portion 250 having a generally constant cross-sectional shape 268 along the lengthwise direction 252. The tip portion 250 is shown having a generally constant triangular cross-sectional shape 264 along the lengthwise direction 252. However, the tip portion 250 may be provided in any cross-sectional shape and is not limited to the triangular cross-sectional shape 264 shown in FIG. 10. In an embodiment, the tip portion 250 may be formed of a relatively small quantity of composite plies 276. For example, the tip portion 250 may be formed of three (3) composite plies 276 each comprising approximately 0.25 inch wide CFRP tape each having a thickness of approx me 0.0075 inch. In this regard, the tip portion 250 may have a maximum tip portion width 254 of approximately 0.25 inch and a tip portion height 256 of approximately 0.023 inch. However, the tip portion 250 may be formed in any tip portion width 254 or tip portion height 256 and may be comprised of any type of composite material 108 and is not limited to CFRP tape.

Figure 11:
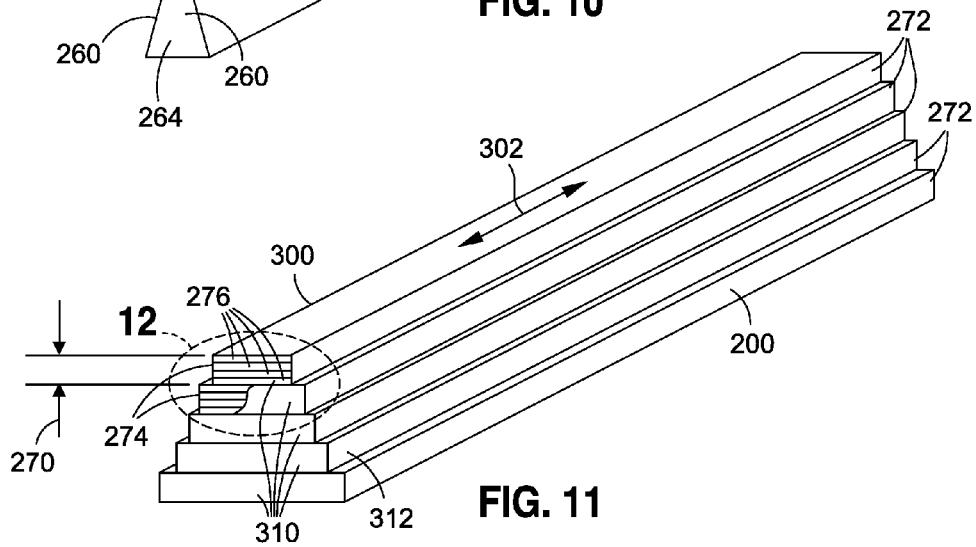
FIG. 11 is a perspective illustration of an embodiment of a keyway portion having a substantially constant cross-sectional shape.

FIG. 11 is a perspective view of an embodiment of a keyway portion 300 having a generally constant cross-sectional shape along a lengthwise direction 302. The keyway portion 300 is shown having a stepped pyramidal cross-sectional shape 312 formed of substantially constant width composite plies 310. In an embodiment, the keyway portion 300 may have a maximum width of less than approximately 0.25 inch although the keyway portion 300 may be provided in any keyway portion width 304. The quantity of composite plies 276 of the keyway portion 300 may be substantially constant such that the keyway portion 300 has a substantially constant height 308 along a lengthwise direction 302. In an embodiment, the keyway portion 300 may contain in the range of approximately eight (8) to 20 composite plies 276 or more. However, the keyway portion 300 may contain less than eight (8) composite plies 276.

Figure 12:
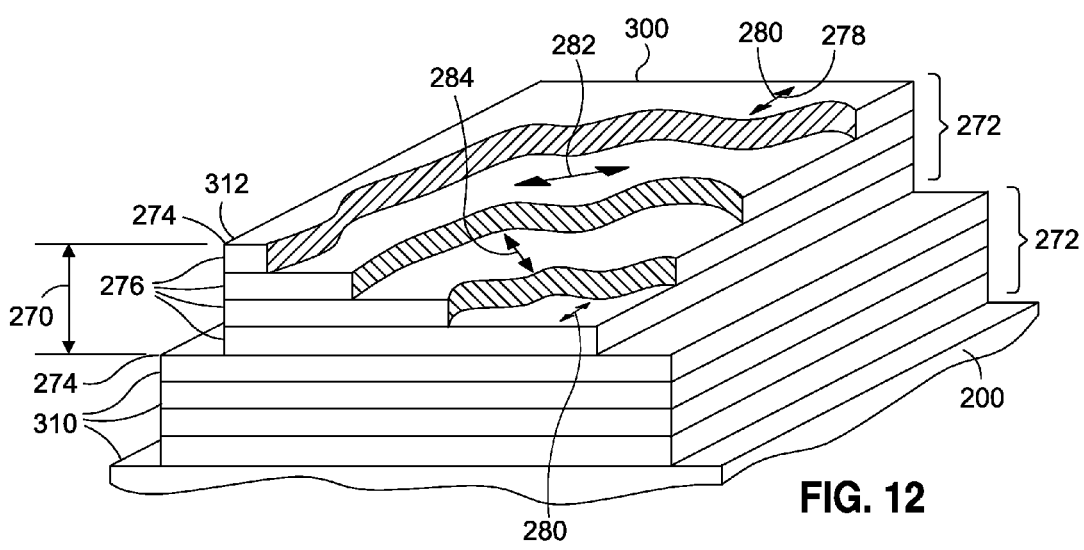
FIG. 12 is a perspective illustration of the keyway portion formed from a laminated charge wherein each laminated charge is comprised of a plurality of composite plies having a predetermined fiber orientation angle sequence.

FIG. 12 is a perspective illustration of an embodiment of the keyway portion 300 formed from a plurality of layers 272. Each one of the layers 272 may comprise a pre-manufactured laminated charge 270 containing a predetermined quantity of composite plies 276. Each one of the layers 272 in the keyway portion 300 may be manufactured from the same laminated charge 270 or from a laminated charge 270 having the same composite material 108 as the remaining layers 272 of the keyway portion 300. Further in this regard, as described below, the base portion 320 may also be formed from one or more laminated charges 270 and which may be substantially similar to the laminated charges 270 used in forming the keyway portion 300.

In FIG. 12, the composite plies 276 in a laminated charge 270 may have a predetermined fiber orientation stacking sequence. For example, FIG. 12 illustrates each layer 272 being formed as a 4-ply charge 274 containing a pair of +45 degree and −45 degree composite plies 282, 284 sandwiched between a pair of 0 degree composite plies 276 with one 0-degree composite ply 280 on each side of the +/−45 degree composite plies 282, 284. However, a laminated charge 270 may be formed of any quantity of composite plies 276 and in any fiber orientation stacking sequence in any range from a 0 degree fiber orientation angle to a 90 degree fiber orientation angle. In an embodiment, the fiber orientation angle 278 stacking sequence may be selected to provide the radius filler 200 with a stiffness that is compatible with the stiffness of the composite structure 106 into which the radius filler 200 is installed. In this regard, the fiber orientation stacking sequence in the tip portion 250, the keyway portion 300, and/or the base portion 320 may be selected to be compatible with the stiffness characteristics of the composite structure 106. In addition, the composite material 108 in the tip portion, the keyway portion 300, and/or the base portion 320 may be selected to be thermally compatible with the composite material 108 of the composite structure 106.

Figure 13:
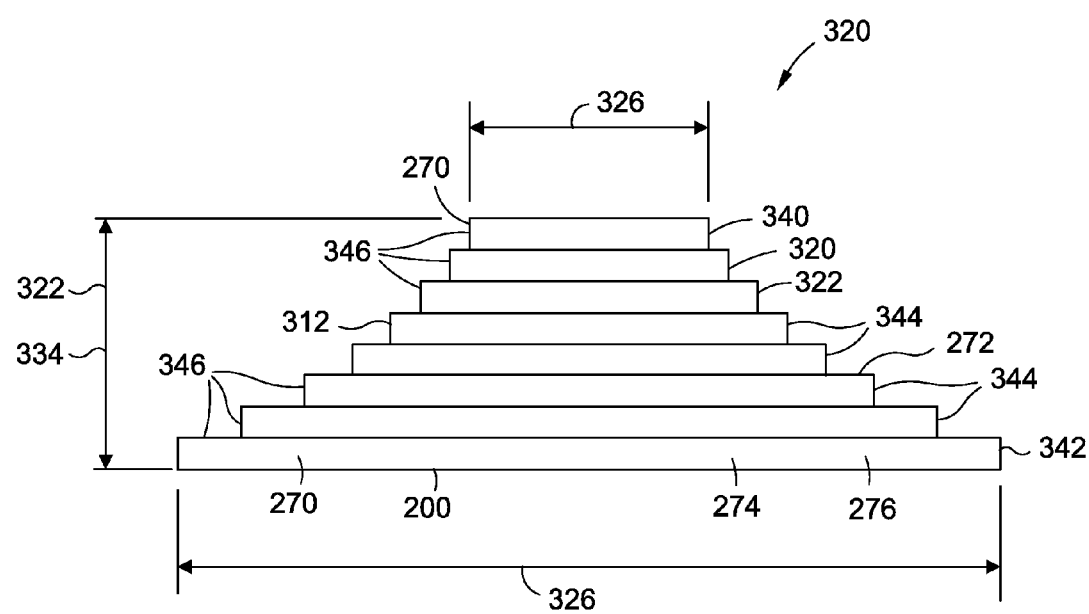
FIG. 13 is a end view of an embodiment of a base portion.

Referring to FIG. 13, shown is an end view of an embodiment of the base portion 320. The base portion 320 may be provided in a stepped pyramidal cross-sectional shape 312 along the lengthwise direction 324. As indicated above, the base portion 320 may have a variable height 334 along the lengthwise direction 324 and may be formed of variable width composite plies 346. The base portion 320 may be formed of a plurality or stack of layers 272 including a base portion top layer 340, a base portion bottom layer 342, and one or more base portion mid layers 344. In an embodiment, each layer 272 may comprise a laminated charge 270 containing a predetermined quantity of composite plies 276 arranged in a predetermined fiber orientation stacking sequence. In FIG. 13, the base portion 320 is comprised of eight (8) layers 272 wherein each layer 272 comprises a 4-ply charge 274 containing +/−45 degree composite plies 282, 284 sandwiched between 0 degree composite plies 276 for a total of 32 composite plies 276 in the base portion 320 of FIG. 13. However, the base portion 320 may be provided with any quantity of composite plies 276. For example, the base portion 320 may contain up to 52 composite plies 276 (e.g. 13 layers of 4-ply charge 274), although the base portion 320 may contain more than 52 composite plies 276.

Figure 14:
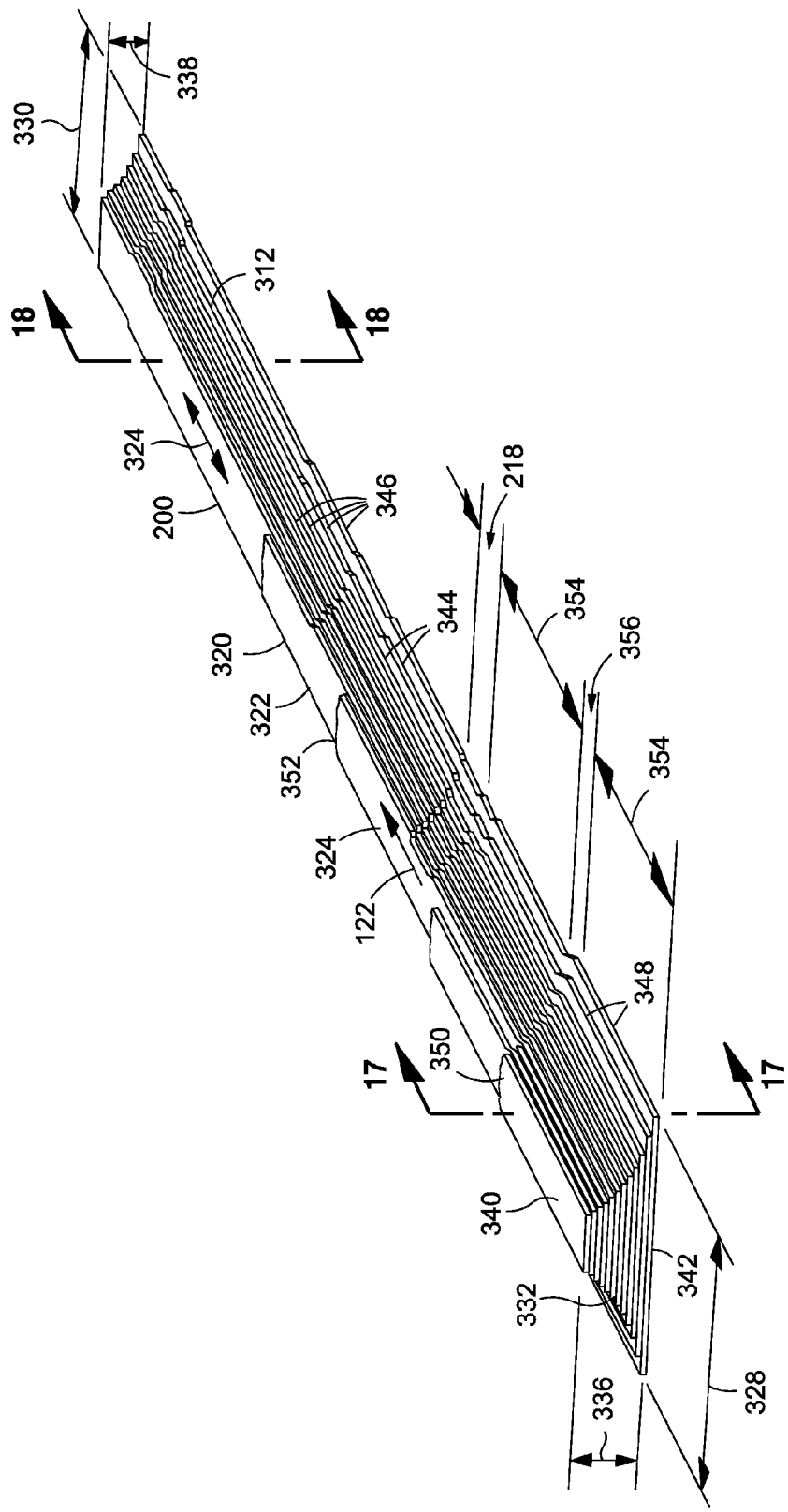
FIG. 14 is a perspective view of an embodiment of a base portion having a variable cross-sectional shape and including a plurality of mid layers, the mid layers terminating at different locations along a lengthwise direction of the base portion.

FIG. 14 is a perspective view of an embodiment of the base portion 320 having a variable cross sectional shape along a lengthwise direction 324. The base portion 320 has a stepped pyramidal cross-sectional shape 312 which has a variable height 334 and which includes variable width composite plies 346 in each one of the layers 272. Each one of the composite plies 276 may have a layer profile shape 348 that varies along the lengthwise direction 324. The layer profile shape 348 may include transition zones 356 that correspond to ply drops 154 or ply additions 160 in the composite structure 106 as described in greater detail below. The left hand side of the base portion 320 in FIG. 14 has an increased cross-sectional area as may be located at a stabilizer root 118 of the horizontal stabilizer 116 of FIG. 2. The right hand side of the base portion 320 in FIG. 14 has a reduced cross sectional area as may be located at a stabilizer tip 120 of the horizontal stabilizer 116. The base portion shown in FIG. 14 may be comprised of a bottom layer 342, one or more mid layers 344, and a top layer (not shown). The mid layers 345 may periodically terminate along a lengthwise direction and may be covered by a substantially continuous top layer 340 as shown in FIG. 15. However, the base portion 320 may be provided in an embodiment where the top layer is omitted as shown in FIG. 14.

FIG. 15 is a perspective view of an embodiment of a base portion 320 having a substantially continuous top layer 340 extending along a length of the base portion 320. The top layer 340 is shown in FIG. 15 in a planar condition prior to conforming the top layer 340 to the stair-step shape of the terminating mid layers 345 as shown in FIG. 16. By forming the top layer 340 as a continuous layer covering the mid layers 345, the cured radius filler 200 may have reduced porosity. The top layer 340 may be provided in a top layer width 341 that may vary with ply drops 154 (FIG. 20) and/or ply additions 160 (FIG. 20) in the composite structure 106. In addition, the top layer width 341 may be sized to provide the radius filler 200 with a desired amount of design overfill along the length of the radius filler 200 and which may improve the strength properties of the cured composite structure 106 as mentioned above.

FIG. 16 is a side view of a part of the base portion 320 of FIG. 15 and illustrating the overlapping of the top layer 340 over the mid layers 345. The top layer 340 may generally follow the stair-step shape formed by the termination of the mid layers 345. In this manner, the top layer 340 may generally cover or encapsulate the mid layers 345 which may improve processing and resulting in improved properties of the cured radius filler 200.

Figure 17:
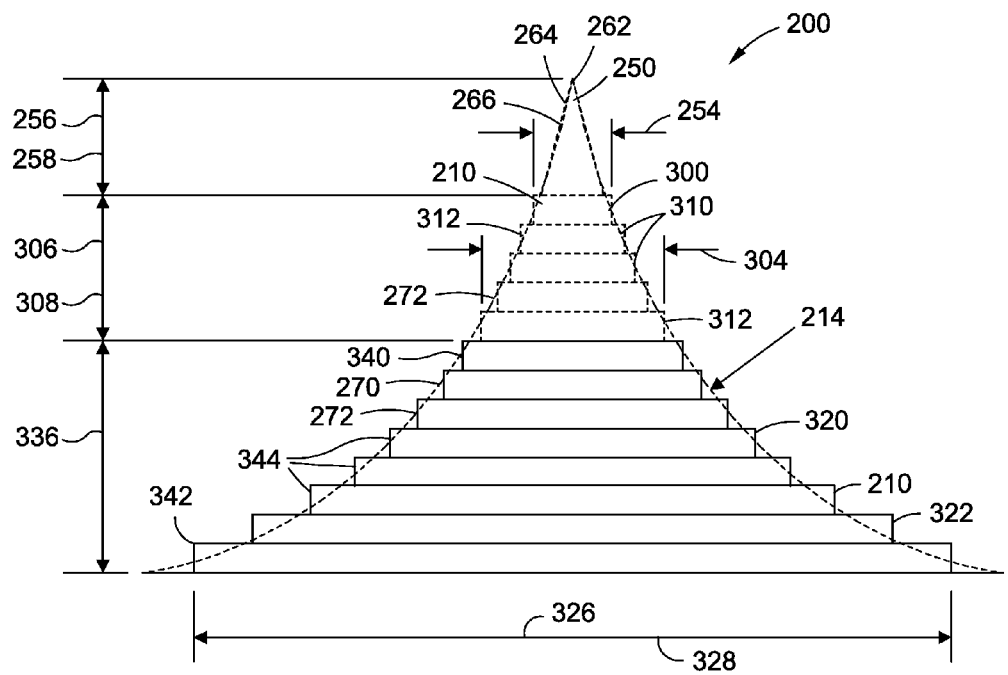
FIG. 17 is a sectional view of the base portion taken along line 15 of FIG. 14 and illustrating the base portion, the keyway portion, and the tip portion collectively forming the radius filler stack having a first radius being formable on opposing sides of the filler radius.

FIG. 17 is a sectional view taken along the left hand side of the base portion 320 of FIG. 14 and illustrating the keyway portion 300 and the tip portion 250 (shown in phantom lines) stacked on top of the base portion 320. The tip portion 250 and the keyway portion 300 have a constant height 258, 308 and may have substantially constant width composite plies 310 along their lengthwise directions 252, 302. The base portion 320 may have a relatively large quantity of layers 272 or composite plies 276 (e.g., 8 layers or 32 composite plies or more) defining a first height 336 and a first width 328. The relatively large cross sectional area of the base portion 320 in FIG. 17 facilitates a relatively large first radius 214 on opposing sides of the radius filler 200.

Figure 18:
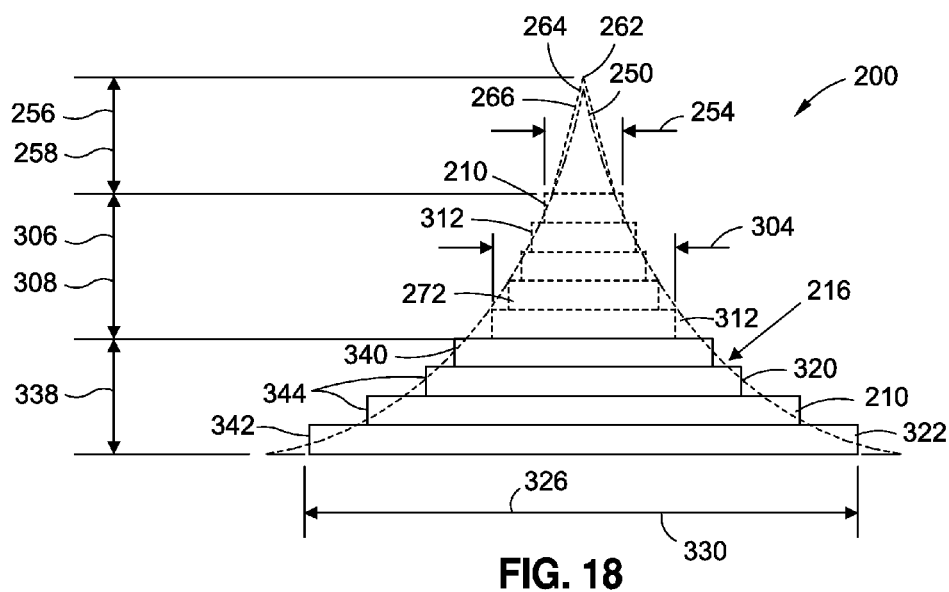
FIG. 18 is a sectional view of the base portion taken along line 16 of FIG. 14 and illustrating a reduced cross-sectional area base portion resulting in the radius filler stack having a second radius being formable on opposing sides of the filler radius and wherein the second radius is smaller than the first radius of FIG. 15.

FIG. 18 is a sectional view taken along the right hand side of the base portion 320 of FIG. 14. The tip portion 250 and the keyway portion 300 in FIG. 18 maintain the substantially constant width composite plies 310 and the same height as the tip portion 250 and the keyway portion 300 in FIG. 17. However, the base portion 320 in FIG. 18 has a reduced quantity of layers 272 or composite plies 276 (e.g., 4 layers or 16 composite pies) which results in a second height 338 of the base portion 320 in FIG. 18 that is reduced relative to the first height 336 of the base portion 320 in FIG. 17. Additionally, the variable width composite plies 346 of the base portion 320 in FIG. 18 have a second width 330 which is reduced relative to the first width 328 of the variable width composite plies 346 in FIG. 17. The reduced cross sectional area of the base portion 320 in FIG. 18 facilitates the formation of a second radius 216 on opposing sides in FIG. 18 that is smaller than the first radius 214 in FIG. 17. In this manner, changes in the cross-sectional shape of the radius filler 200 may be facilitated by changing the width of the variable width composite plies 346 along a lengthwise direction 324 of the base portion 320, and/or by reducing the quantity of composite plies 276 or layers 272 by terminating one or more top layers 340 of the base portion 320 along a lengthwise direction 324.

Figure 19:
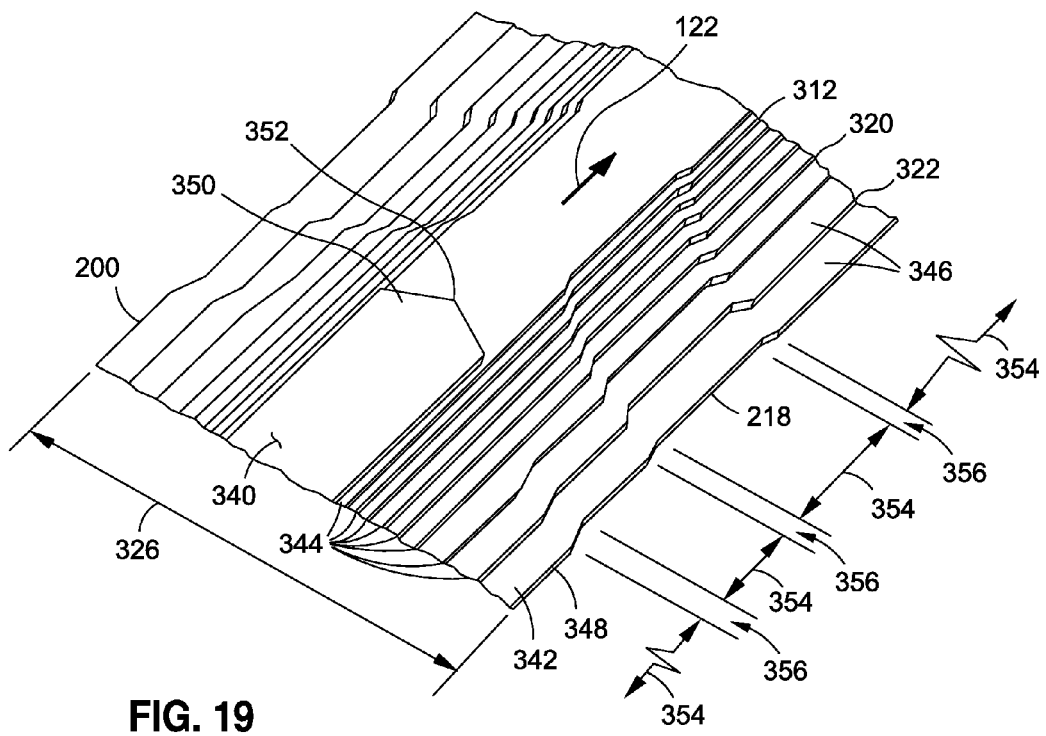
FIG. 19 is a perspective view of a part of the base portion illustrating a termination of a mid layer to achieve a reduction in the base portion height and in the cross-sectional area.

FIG. 19 illustrates the termination of a mid layer 345 of the base portion 320 to achieve a reduction in the base portion height 332 and resulting in a reduction in the cross-sectional area of the radius filler 200. In an embodiment, the terminating end 350 of the mid layer 345 may have a non-square shape 352 which may improve the ability of the radius filler 200 to fill the volume of the radius filler region 140 and which may increase the strength and stiffness characteristics of the final composite structure 106. For example, the terminating end 350 of a mid layer 345 may have a generally pointed shape or the terminating end 350 may have a generally rounded shape (not shown). As indicated above, the composite structure 106 may have a generally tapered or reducing thickness facilitated by one or more ply drops 154 along a lengthwise direction of the composite structure 106. In addition, the composite structure 106 may have localized increases in thickness due to one or more ply additions 160 in the composite structure 106. In this regard, the base portion 320 may include one or more constant zones 354 comprising regions wherein the base portion 320 has a relatively constant cross-sectional shape and which may be separated by transition zones 356 comprising regions of change in the cross sectional shape of the base portion 320. The transition zones 356 may be positioned adjacent to ply drops 154 and/or ply additions 160 in the composite structure 106. Each transition zone 356 may comprise a change in the base portion width 326 and/or a change in the base portion height 332 in correspondence with the ply drop(s) 154 and/or the ply addition(s) 160 in the composite structure 106.

Figure 20:
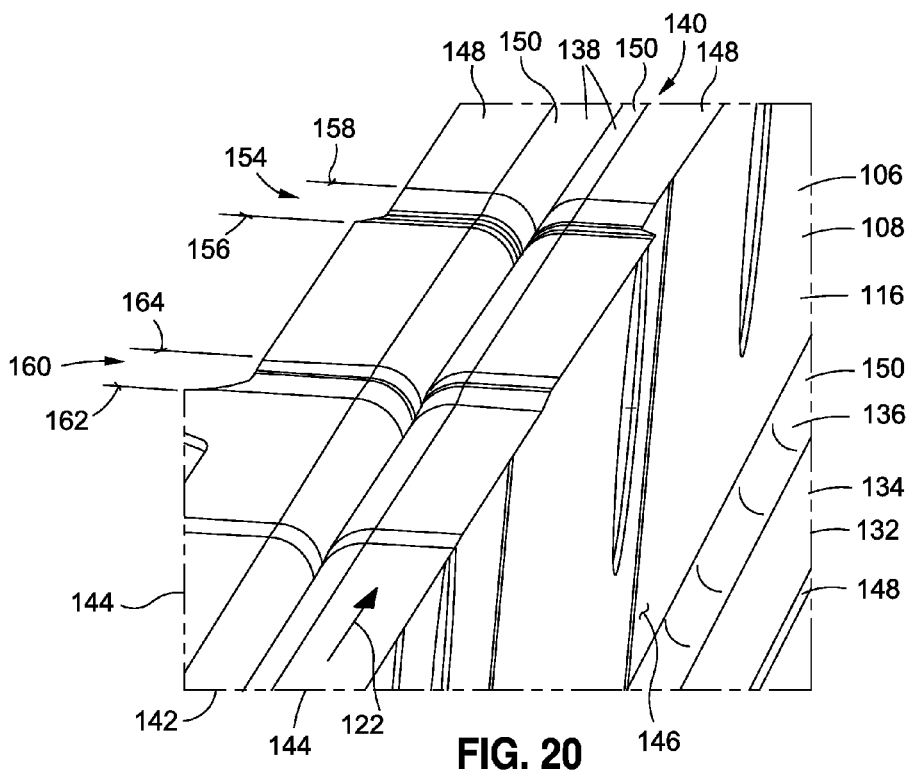
FIG. 20 is a perspective view of a portion of an I-beam composite structure illustrating a radius filler region on a top side of the I-beam and further illustrating localized ply additions and ply drops in the I-beam which are accommodated by transition zones in the cross-sectional area of the base portion as a means to maintain a substantially constant stiffener inner radius along the I-beam.

FIG. 20 shows a composite structure 106 having a changing thickness along a lengthwise direction. The changing thickness may include a stiffener ply drop 154 wherein one or more composite plies 276 of the composite structure 106 may be terminated. The changing thickness of a composite structure 106 may also include a stiffener ply addition 160 wherein one or more composite plies 276 of the composite structure 106 may be added. The stiffener ply drops 154 and stiffener ply additions 160 may result in variation in the stiffener outer radii 138 (FIG. 3) along the length of the flanges 148. Advantageously, the variable cross-sectional shape 322 of the radius filler 200 disclosed herein may be contoured complementary to the variation in stiffener outer radii 138. In this manner, the stiffener inner radii 136 of the composite structure 106 may be substantially constant along a lengthwise direction and which may improve the inspectability of the composite structure 106 and may additionally reduce tooling costs associated with manufacturing the composite stiffener 134.

Figure 21:
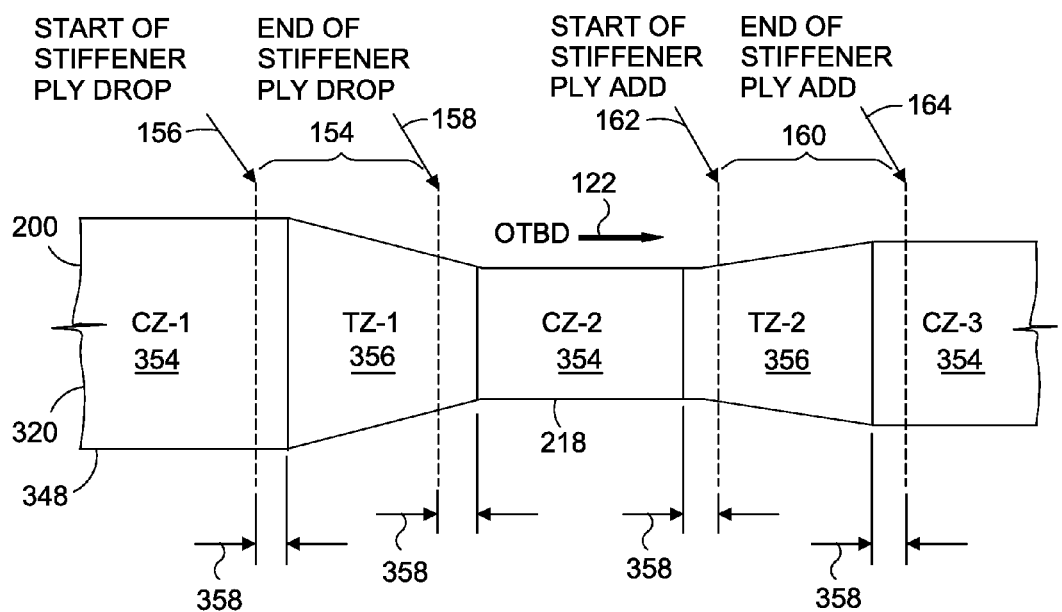
FIG. 21 is a schematic top view of an embodiment of a layer profile shape of one or more composite plies of a base portion having transition zones that are offset from the start of a ply drop or a ply addition in a composite structure into which the radius filler is installed.

FIG. 21 is a plan view of a layer profile shape 348 of one or more composite plies 276 of the base portion 320. As indicated above, the base portion 320 may be configured with transition zones 356 corresponding to ply drops 154 and ply additions 160 in the composite structure 106. Each transition zone 356 may be offset 358 from the start 156 of a ply drop 154 or the start 162 of a ply addition 160. A ply drop 154 may comprise a region along which one or more composite plies 276 may be terminated from the composite structure 106. A ply addition 160 may comprise a region along which one or more composite plies 276 may be added to the composite structure 106.

In FIG. 21, the base portion 320 may be configured such that for ply drops 154 in the composite structure, the start of a transition zone 356 in the base portion 320 may be positioned after the start 156 of a stiffener ply drop 154. The end of a transition zone 356 in the base portion 320 may be positioned after the end 158 of a stiffener ply drop 154. Conversely, for ply additions 160 in the composite structure, the start of the transition zone 356 in the base portion 320 may be positioned before the start 162 of a stiffener ply addition 160, and the end of the transition zone 356 in the base portion 320 may be positioned before the end 164 of the stiffener ply addition 160 in the composite structure 106. In an embodiment, transition zones 356 may be offset 358 from the start 156 and of the stiffener ply drops 154 and ply additions 160 by a distance of approximately 0.10 inch 0.50 inch or larger. In a further embodiment, the offset 358 distance may be approximately 0.25 inch. It has been determined that offsetting the transition zones 356 from the start 156 and end 158 of ply drops 154 and ply additions 160 improves the filling of the radius filler region 140 with the radius filler disclosed herein which improves the strength, stiffness, and inspectability of the composite structure 106.

Figure 22:
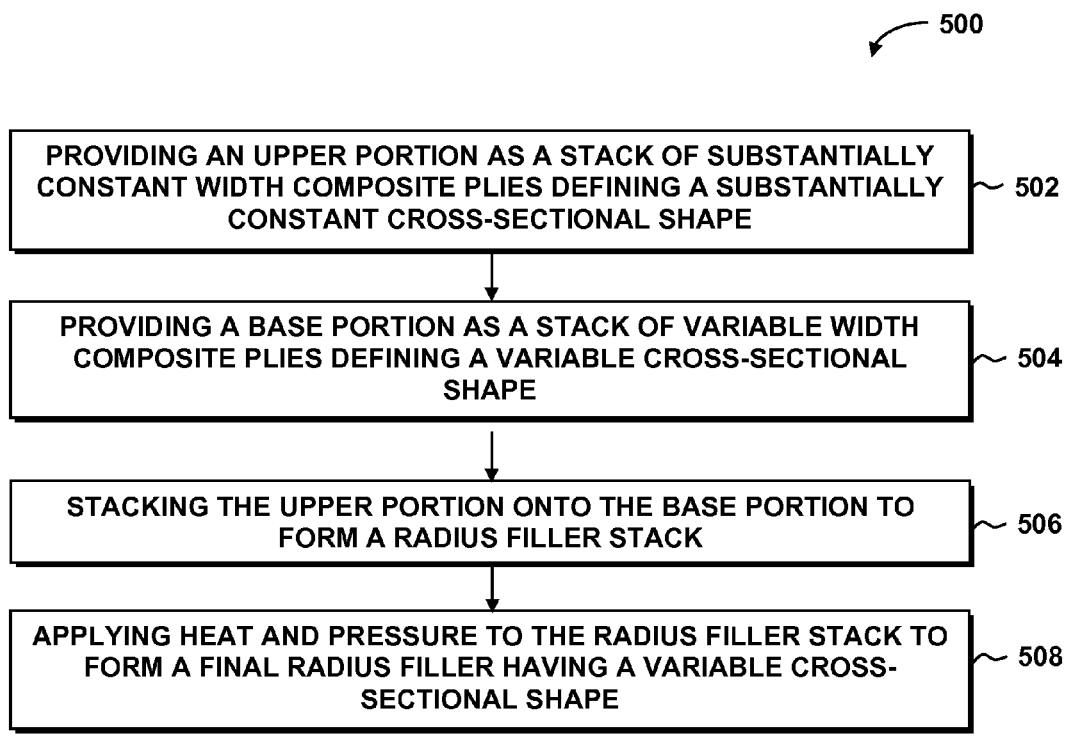
FIG. 22 is a flow chart illustrating one or more operations that may be included in a method of forming a radius filler.

Referring to FIG. 22, shown is a flow chart illustrating an embodiment of a method 500 of forming a radius filler 200. The method may include Step 502 comprising providing an upper portion 212 of the radius filler 200 as a stack of substantially constant width composite plies 310 as shown in FIG. 6. As indicated above, the upper portion 212 may comprise a tip portion 250 and a keyway portion 300. The tip portion 250 and the keyway portion 300 may each have a substantially constant cross-sectional shape along a lengthwise direction 252, 302. The method may include forming the upper portion 212 in a stepped pyramidal variable cross-sectional shape 322 as shown in FIG. 6.

Step 502 of the method 500 of FIG. 22 may further include forming the tip portion 250 as a stack of less than five (5) composite plies 276 (e.g., three composite plies). In an embodiment, the tip portion 250 may be formed with in a generally triangular cross-sectional shape 264. The tip portion 250 may have a substantially constant cross-sectional area 266 (FIG. 10) along the lengthwise direction 252 even though the cross-sectional shape of the tip portion 250 may change along the lengthwise direction 252. The method may further include forming the keyway portion 300 as a stack of substantially constant width composite plies 310 (FIG. 11) from a pre-manufactured laminated charge 270 wherein the composite plies have a pre-determined fiber orientation angle 278 (e.g., FIG. 12). The keyway portion 300 may have a substantially constant stepped pyramidal cross-sectional shape 312 (FIG. 11) along the lengthwise direction 302. The upper portion 212 may be formed by stacking the tip portion 250 onto the keyway portion 300 (FIG. 5).

Step 504 of the method 500 of FIG. 22 may include providing the base portion 320 (FIG. 13) as a stack of variable width composite plies 346 defining a variable cross-sectional shape 322 of the base portion 320 along the lengthwise direction 324 as illustrated in FIGS. 14 and 17. In an embodiment, the method may include forming the base portion 320 in a stepped pyramidal variable cross-sectional shape 322 by providing the layers 272 in successively narrower widths from the bottom layer 342 (FIG. 13) of the base portion 320 toward the top layer 340 of the base portion 320.

Step 506 of the method 500 of FIG. 22 may include stacking the upper portion 212 onto the base portion 320 to form a radius filler stack 210 as shown in FIGS. 15-16. Step 506 may include forming one or more transition zones 356 in the base portion 320 wherein the transition zone 356 comprises the location of a change in the base portion width 326 and/or a change in the base portion height 332 as shown in FIGS. 14 and 17. The method may further include locating each transition zone 356 in correspondence with a ply drop 154 of a composite structure 106 or a ply addition 160 of the composite structure 106 as shown in FIG. 21. In this regard, Step 506 may include positioning the transition zone 356 before a ply drop 154 and after a ply addition 160. Changing the base portion width 326 may include terminating one or more mid layers 345 of the base portion 320 at the location of a ply drop 154 in the composite structure 106 and providing the terminating end 350 in a non-square shape 352 such as in a generally rounded shape or in pointed shape as shown in FIG. 19.

Step 508 of the method 500 of FIG. 22 may include applying heat 238 and pressure 236 to the radius filler stack 210 in a forming die 230 to form a final radius filler 206 having a variable cross-sectional shape 322. In this regard, Step 508 may include providing the forming die 230 with a die cavity 232 that may be configured complementary to the changing contour of the stiffener outer radii 138 of a radius filler region 140 of a composite structure 106. In this manner, the stiffener inner radii 136 may be generally constant along a lengthwise direction which may improve inspectability and reduce tooling costs associated with the composite stiffener.

Figure 23:
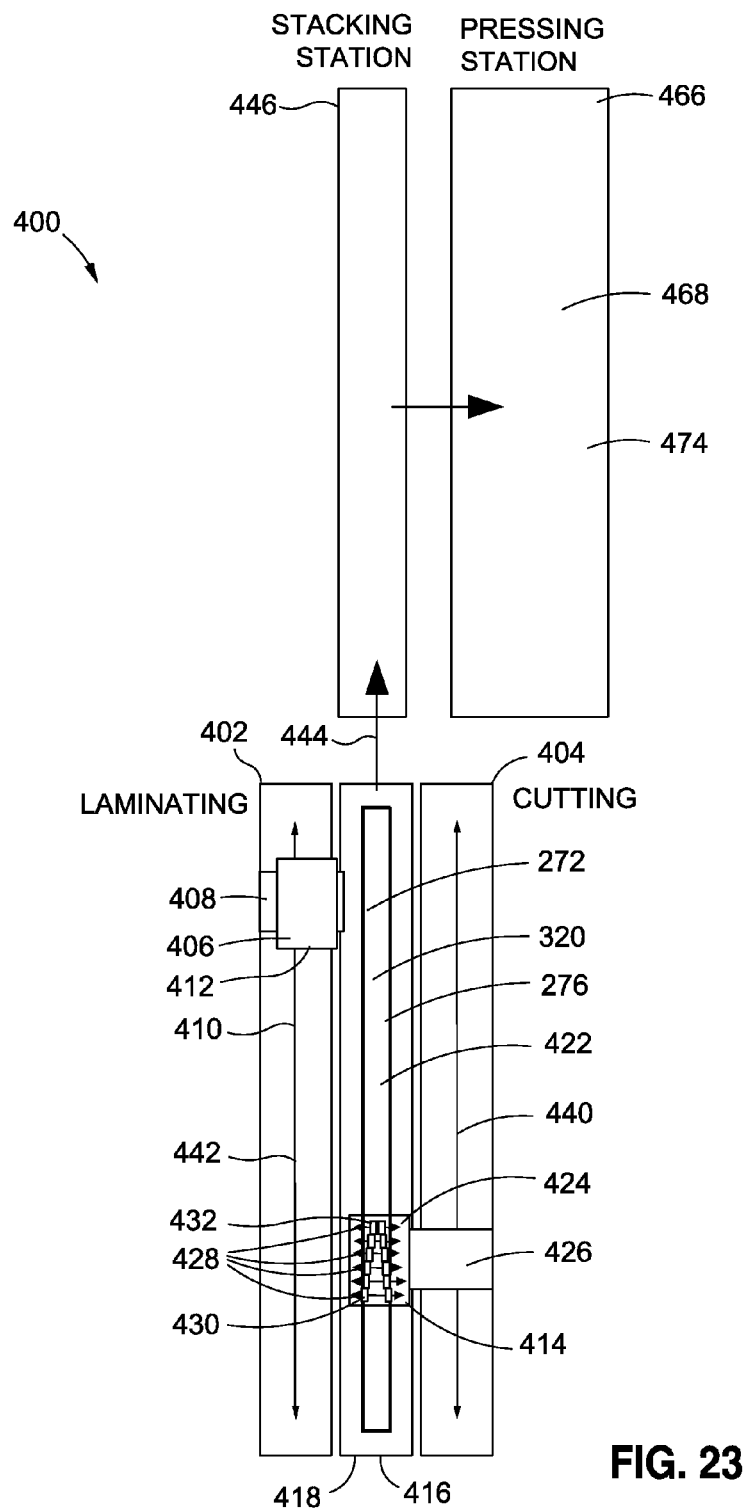
FIG. 23 is a schematic top view of an embodiment of a system for manufacturing radius filler.

Referring to FIG. 23, shown is top schematic view of an embodiment of a system 400 that may be implemented for automated manufacturing of a composite laminated radius filler 200 having a variable cross-sectional shape 322. The system 400 may include a laminating station 402, a cutting station 404, a stacking station 446, and a pressing station 466. In an embodiment, the laminating station 402 and the cutting station 404 may be combined into a single location. Likewise, the stacking station 446 and the pressing station 466 may be combined into a single location. It is also contemplated that any one of the stations disclosed herein may be combined with any one of the other stations into a single location in order to simplify manufacturing and minimize the requirement for translating or moving the radius filler from station to station. The system 400 advantageously provides a means for automated or semi-automated laminating, cutting, stacking, and pressing of radius fillers 200 such as for use in radius filler regions 140 of structural composite components such as the I-beam composite stiffener 134 shown in FIGS. 2-3. The system 400 may minimize or eliminate the need for hand layup of radius fillers and may result in a significant improvement in the consistency and quality of radius fillers 200.

In FIG. 23, the laminating station 402 may include a laminating head 406 that may be coupled to a laminating head drive system 408. In this regard, the laminating head 406 may be configured as a tape laying machine for applying tape or composite plies 276 onto a lamination/cutting table 416. The lamination/cutting table 416 may be configured as a vacuum table 418 having a vacuum pump 420 (FIG. 29) for applying a suction force on the laminated composite plies 276 to prevent movement thereof during the laminating and cutting process. In an embodiment, the laminating head 406 may be configured to apply single composite plies 276 of any fiber angle orientation, or the laminating head 406 may be configured to apply individual multi-ply layers onto the cutting table 416. Each individual multi-ply layer 272 may comprise a laminating charge 270 (e.g., a 4-ply charge 274—FIG. 12) comprising a pre-manufactured stack of composite plies 276 having a predetermined fiber orientation angle 278 sequence as described above. The laminating head 406 may be configured to lay-up a laminated stack 422 in any thickness such as in a thickness of up to 0.75 inch or more, and in any width such as in widths of up to 18 inches or more. In the present disclosure, a laminated stack 422 is comprised of a stack of composite plies 276 of any quantity and may include an individual composite ply 276, an individual multi-ply layer 272 (e.g., a laminated charge 270), or a stack of multi-ply layers 272. FIG. 22 illustrates a direction of movement 410 of the laminating head 406 along a laminating direction 442 to apply composite plies 276 or layers 272 of a laminated charge 270 onto the lamination/cutting table 416 to form a laminated stack 422.

Referring to FIG. 24, shown is a cutting head 424 having a plurality of blades 432 for cutting the laminated stack 422 positioned on the lamination/cutting table 416. The cutting head 424 may be operatively coupled to a cutting head drive system 426 for moving the cutting head 424 lengthwise along the length of the laminated stack 422. In an embodiment, the lamination/cutting table 416 may have a cutting surface such as self-healing surface to allow cutting into the surface without damaging the blades 432 of the cutting head 424. The laminating head 406 may be moved to a home position 412 when the cutting head 424 is an in active position 414 cutting the laminated stack 422 along a cutting direction 440. After cutting an individual multiply layer 272 or cutting a laminated stack 422 into a base portion 320, the lamination/cutting table 416 may be translated into a stacking station 446 where a lifting mechanism 454 may lift each individual multi-ply layer 272 (e.g., laminated charge 270) onto a layup table for stacking with other multi-ply layers 272 to form a base portion 320 and/or a radius filler stack 210. The cutting head 424 may also cut a laminated stack 422 into a stepped pyramidal base portion 320 which may then be moved into the stacking station 446. At the stacking station 446, the lifting mechanism may lift and translate the base portion 320 onto the layup table 450 for stacking with the remaining components of the radius filler 200. The radius filler stack 210 may then be transferred into a pressing station 466 for forming into a final radius filler 206 as described below.

Referring to FIG. 25, shown is a top view of a cutting head 424 which may include one or more cutters 428. Although the cutting head 424 is shown having twelve (12) cutters 428, any number of cutters 428 may be provided. The cutters 428 may be arranged in staggered, side-by-side configuration 430, although the cutters 428 may be arranged in other configurations not shown. The cutters 428 may be movable along a lengthwise direction of the laminated stack 422 supported on the lamination/cutting table 416. The cutting head 424 may be configured to cut individual multi-ply layers 272 in on or more passes. The cutting head 424 may be configured to cut a laminated stack 422 of multi-ply layers 272 in a single pass or in multiple passes. Advantageously, the one or more cutters 428 may be individually movable along a lateral 438 direction during movement of the cutting head 424 along the lengthwise direction. In this manner, the cutters 428 may cut the laminated stack 422 into a variable cross-sectional shape 322 of the base portion 320. More specifically, each one of the cutters 428 may be configured to cut one or more composite plies 276 into a predetermined layer profile shape 348 such as the layer profile shapes 348 of the base portion 320 shown in FIG. 14.

In FIG. 26, shown is a side view of a cutting head 424 having cutters 428 arranged in a staggered formation and moving along a cutting direction 440. Each one of the cutters 428 may have a cutting means for cutting one or more composite plies 276 or multi-ply layers 272, or a laminated stack 422 comprising a plurality of multi-ply layers 272. The cutting means may comprise an excited cutting means or the cutting means may comprise a non-excited cutting means. An excited cutting means may comprise an ultrasonic 434 knife or blade for cutting one or more composite plies 276 (e.g., approximately 0.0075 inch thick) at a relatively small depth tolerance (e.g., approximately 0.0005 inch). Advantageously, ultrasonic 434 blades may be easily plunged into the composite plies 276 without significant downward force. Non-excited cutting means (not shown) may comprise a rotary cutter such as a disk cutter, a rolling cutter, or other cutter configurations.

FIG. 26 illustrates traces in dashed lines illustrating the cutting path of each blade 432 passing through a laminated stack 422. The blades 432 may be arranged in a staggered formation as shown in FIGS. 23-25 wherein the uppermost blades 432 may be located furthest forward along the cutting direction 440 and furthest inboard (e.g., nearest a center of the laminated stack 422 or nearest a centerline of a base portion 320). The lowermost blades 432 may be located furthest aft and furthest outboard. Each one of the blades 432 may be individually adjustable along a vertical direction 436 to correspond to a ply depth of the composite ply to be cut by a blade 432. As was indicated above, the cutting head 424 may also comprise a single (not shown) blade 432 that may be movable along a lengthwise direction and along a vertical direction 436 and a lateral direction 438. The cutting head 424 may include any number of blades 432 to cut an individual multi-ply layer 272 into a desired layer profile shape of a base portion 320, or to cut a stack of multi-ply layers 272. Individual multi-ply layers 272 may be moved into the stacking station 446 after cutting. The individual multi-ply layers 272 may then be stacked on top of one another at the stacking station to form a base portion 320 of the radius filler 200 as described below.

Figure 27:
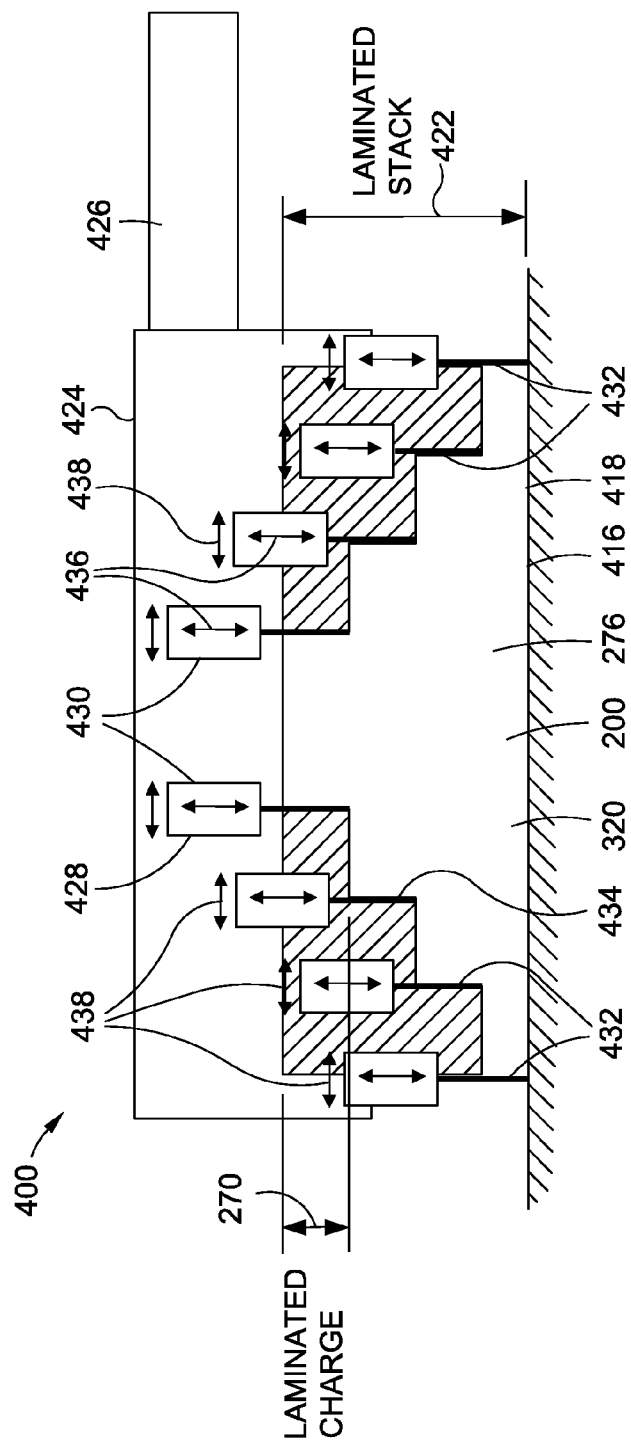
FIG. 27 is an end view of an embodiment of a cutting head taken along line 24 of FIG. 23 and illustrating the cutting head cutting through a laminated stack.

FIG. 27 shows an end view of an embodiment of a cutting head 424 cutting through a laminated stack 422 of multi-ply layers 272 such as to form a base portion 320 of a radius filler 200. The blades 432 may be positionable in a vertical orientation at different ply depths corresponding to one of the composite plies 276 to be cut. Depending on a thickness of the laminated stack 422 and the depth of each cut, the cutting head 424 may make 1 to 3 or more cutting passes along the laminated stack 422. The blades 432 may be configured to form vertical cuts in the laminated stack 422 to produce a base portion 320 having the stepped pyramidal cross-sectional shape 312. Scrap (shown in cross-hatch) may be removed during or following the cutting of the laminated stack 422.

In an embodiment not shown, one or more of the blades 432 may be positionable in an angled orientation (not shown) to form angled cuts (not shown) in the laminated stack 422 such as to form a base portion 320 having a trapezoidal cross-sectional shape (not shown). As indicated above, the blades 432 may be individually movable along a lateral 438 direction during movement of the cutting head 424 along the lengthwise direction so that the composite plies 276 are cut into a predetermined layer profile shape 348 to provide a variable cross-sectional shape 322 to the base portion 320. The cutters 428 may also be configured to terminate one or more mid layers 340 of the base portion 320 in a manner described above and illustrated in FIGS. 14, 15, and 17. Although not shown, the cutting head 424 may also be implemented for cutting the keyway portion 300 and/or the tip portion 250 of the radius filler 200.

Figure 28:
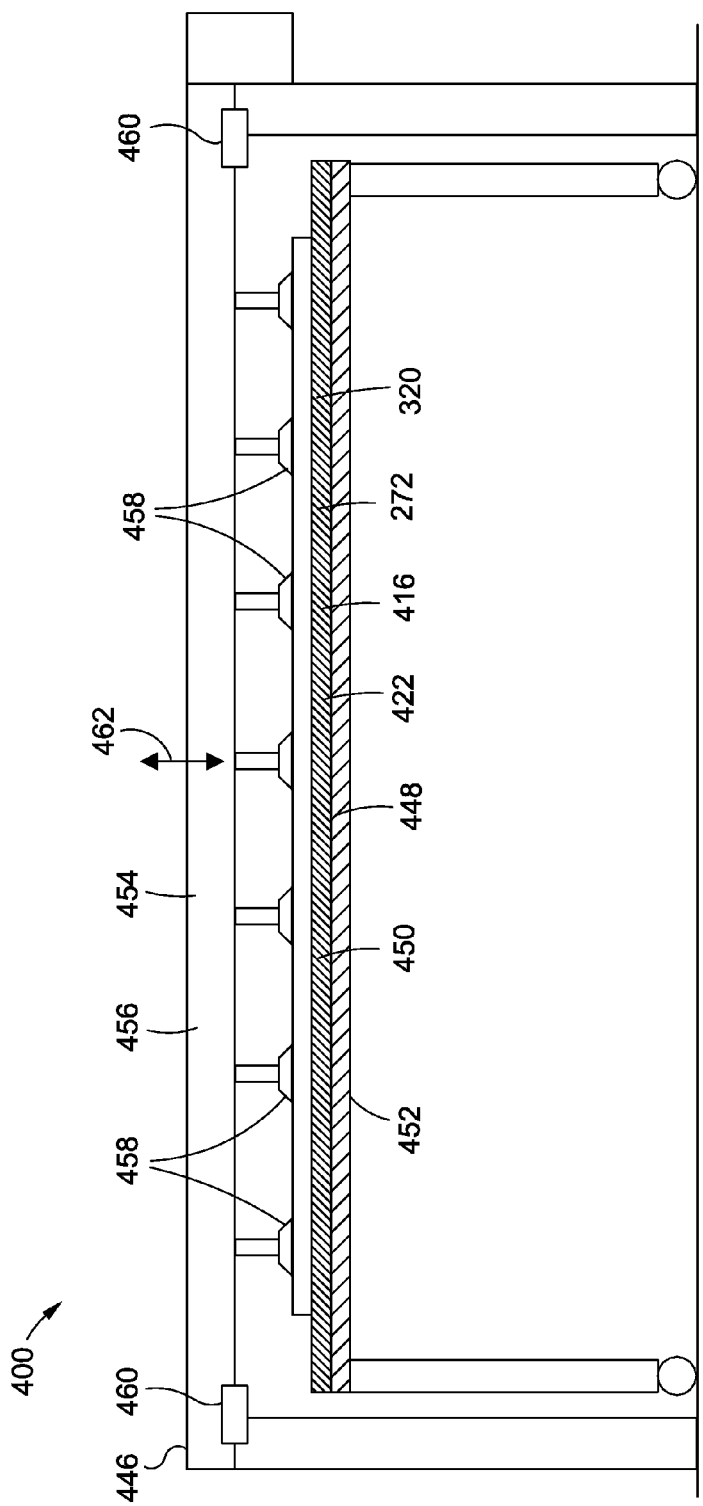
FIG. 28 is a side schematic view of a stacking station.

FIG. 28 a side view of an embodiment of a stacking station 446. Individual multi-ply layers 272 or a stepped pyramidal base portion 320 that was cut from the laminated stack 422 at the cutting station 404 may be moved into the stacking station 446 such as by rolling the lamination/cutting table 416 into position at the stacking station 446. Alternatively, the stacking station 446 may include a stacking table 448 such as a vacuum table 418 for receiving individual multi-ply layers 272 or for receiving the stepped pyramidal base portion 320 and/or other components of the radius filler 200. One or more layup tables 450 may also be positioned on one or both sides of the vacuum table 418 at the stacking station 446. The layup tables 450 may have a table surface 452 upon which the radius filler components may be stacked in an automated manner or by manual stacking. The cutting table 416 may include supports for supporting the layup table 450.

In FIG. 28, a lifting mechanism 454 may be included at the stacking station 446 to assist in translating 444 individual multi-ply layers 272 or a base portion 320 from the stacking table 448 onto a layup table 450. The layup table 450 may be positionable adjacent to the stacking table 448. In an embodiment, the lifting mechanism 454 may be vertically 462 movable for picking up an individual multi-ply layer 272 or a base portion 320 and placing the individual multi-ply layers 272 or the base portion 320 onto the layup table 450. In an embodiment, the lifting mechanism 454 may comprise a pick-and-place mechanism having a vacuum rail 456 with a plurality of spaced-apart vacuum pads 458 connected to a vacuum source (not shown). The vacuum pads 458 may apply a suction force to a top surface of an individual multi-ply layer 272 or base portion 320 for lifting the individual multi-ply layers 272 or base portion 320 off of the cutting table 416 or stacking table 448 and placing an individual multi-ply layer 272 or base portion 320 onto the layup table 450 or into a stacking fixture (not shown).

Figure 29:
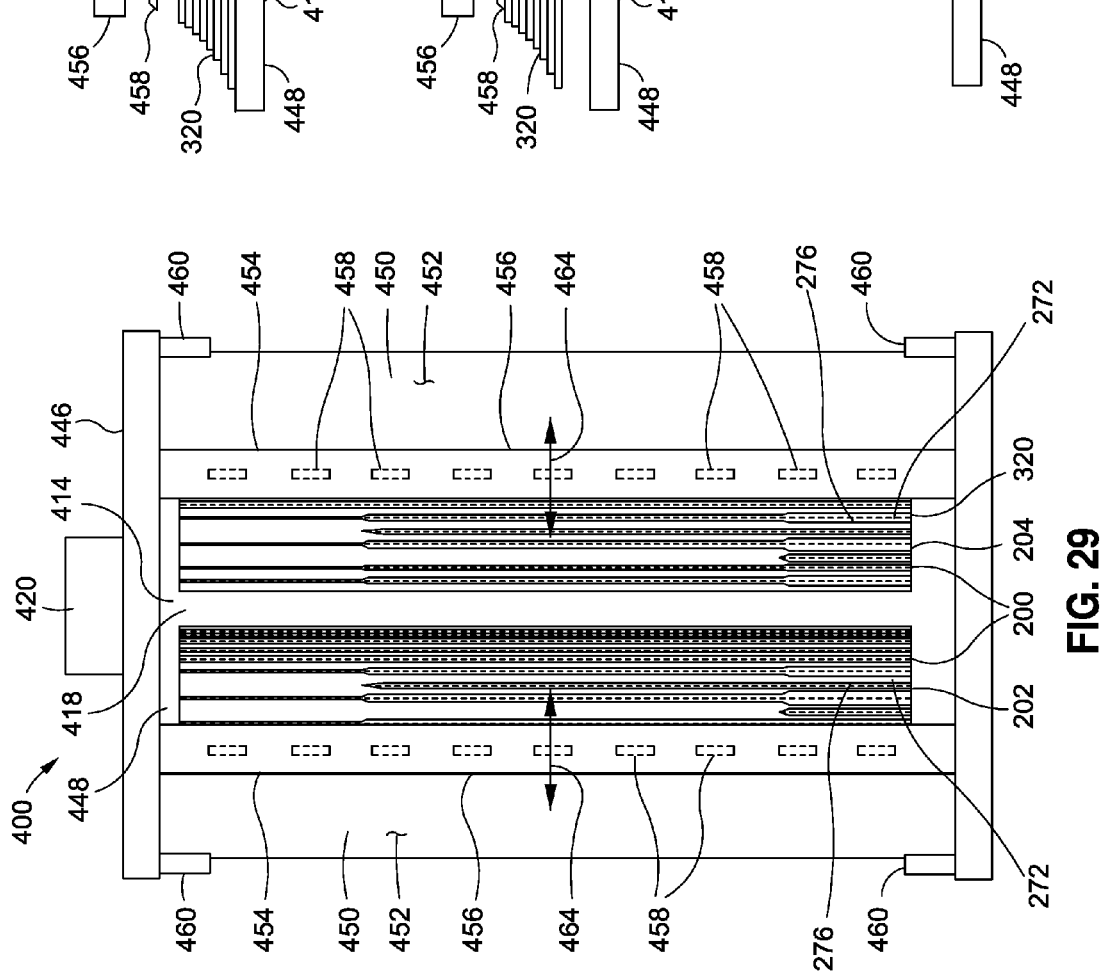
FIG. 29 is a top view of the stacking station having a pair of individual multi-ply layers supported on a vacuum table prior to translating the multi-ply layers onto a layup table.

FIG. 29 is a top view of an embodiment of a stacking station 446 having a vacuum table 418. The vacuum table is shown supporting an individual multi-ply layer 272 for an upper radius filler 202 (FIG. 3) and an individual multi-ply layer 272 for a lower radius filler 204 (FIG. 3) of a composite structure 106. The stacking station 446 may include one or more vacuum rails 456 that may be aligned to the centerline of the top ply of one of the base portions 320 such as by using a laser alignment system (not shown) or other alignment device. An individual multi-ply layer 272 or a base portion 320 may be lifted by the vacuum rail 456 and laterally 464 moved or translated over to an adjacently-positioned layup table 450.

Figure 30:
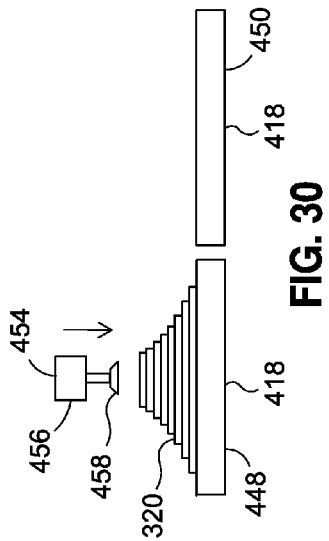
FIG. 30 is a schematic end view of a vacuum rail translating a base portion from a vacuum table onto a layup table.

FIG. 30 shows a vacuum rail 456 aligned over the center of a top layer 340 of a base portion 320. The vacuum rail 456 may be lowered into the vacuum pads 458 into contact with the top layer 340. A suction force may be applied to the vacuum pads 458 so that the vacuum pad may be secured to the upper surface of the base portion 320.

Figure 31:
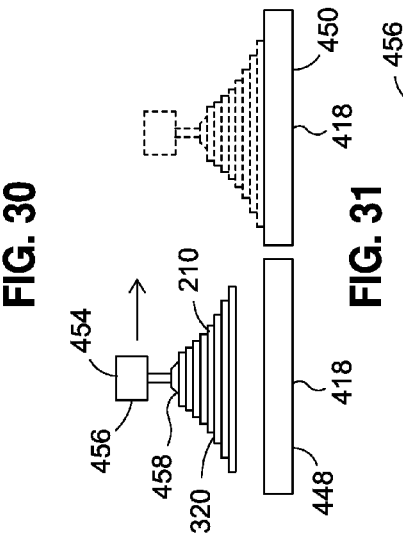
FIG. 31 is a schematic end view of the vacuum rail lifting the base portion off of a cutting table prior to translating the base portion onto the layup table.

FIG. 31 illustrates the base portion 320 of FIG. 30 lifted by the vacuum rail 456 and translated over to the layup table 450. The stacking station 446 may include an indexing device 460 to control the positioning of the vacuum rail 456. The indexing device 460 may comprise a mechanical stop, a machine vision system, a laser system, or any other indexing device 460 for controlling the position of the vacuum rail 456. The base portion 320 may be lowered onto the layup table 450 and suction force may be removed from the vacuum pads 458 to release the base portion 320. Individual multi-ply layers 272 may be stacked onto the layup table 450 in the same manner.

Figure 32:
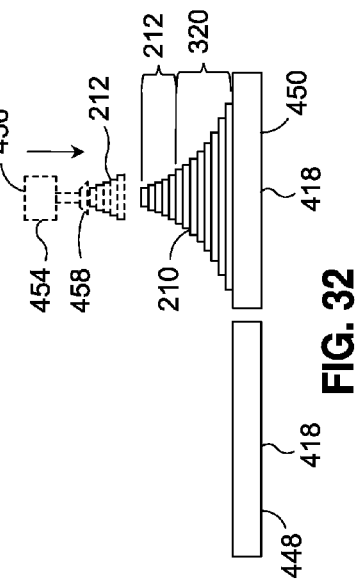
FIG. 32 is a schematic end view of the vacuum rail stacking an upper portion onto the base portion to form a radius filler stack.

FIG. 32 illustrates a vacuum rail 456 being used to stack an upper portion 212 of composite plies 276 (e.g., a keyway portion 300 and/or tip portion 250) onto a base portion 320 to form a radius filler stack 210. A radius filler stack 210 may also be formed by staking up a plurality of multi-ply layers 272 that may be individually cut by the cutting head 424. At the completion of the stacking of a radius filler stack 210, the radius filler stack 210 may be moved to the pressing station 466. The vacuum rail 456 and the indexing device 460 may be employed for stacking any number of composite plies 276 or layers 272 onto layup table 450 until all composite plies 276 are stacked. For example, FIG. 32.

Figure 33:
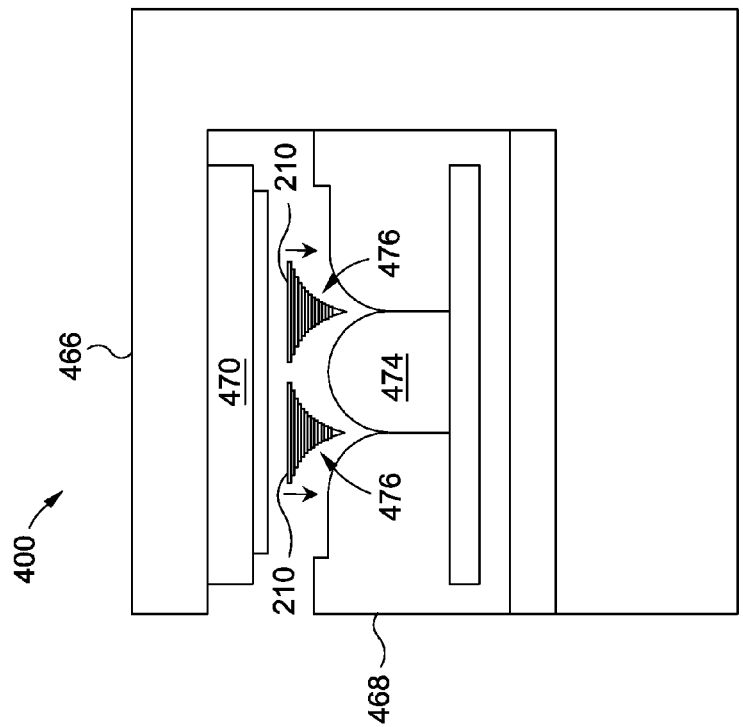
FIG. 33 is a schematic side view of an embodiment of a pressing station for forming each one of a pair of radius filler stacks into a final radius filler.

FIG. 33 is a side view of a pressing station 466 for forming a pair of radius filler stacks 210 into final radius fillers 206. The pressing station 466 may include one or more presses 468 having at least one forming die 230. Each forming die 230 may be configured to receive a radius filler stack 210 comprising an upper portion 212 stacked onto the base portion 320. Although shown in an inverted configuration, the forming die cavity 232 may be configured to receive the radius filler stack 210 in an upright configuration (not shown). Each press 468 may include a heating device (not shown) for heating the radius filler stack 210. For example, the heating device may comprise a resistance heating heat plate 470 and/or a heating die, or the press 468 may be positioned within an autoclave or a convection oven for heating the press 468 and the radius filler stack(s) 210.

Figure 34:
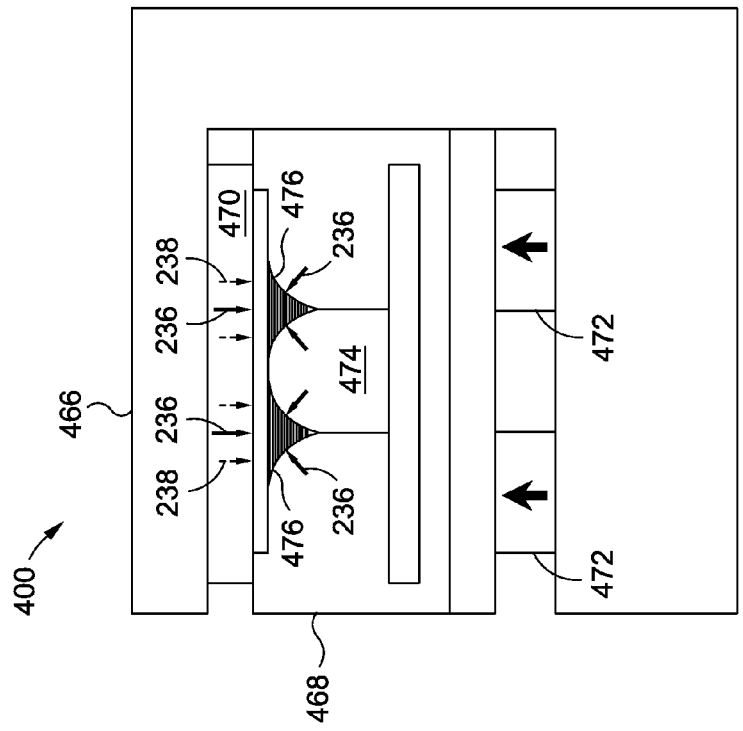
FIG. 34 is a schematic side view of the pressing station illustrating the application of heat and pressure to the pair of radius filler stacks to form the final radius fillers into a variable cross-sectional shape that may be contoured complementary to the corresponding radius filler regions of a composite structure.

FIG. 34 illustrates the press 468 in an activated state for applying heat and pressure to the pair of radius filler stacks 210 mounted within the dye cavities 476. The press 468 may include one or more actuators 472 configured to apply pressure to the radius filler stacks 210 during heating thereof. The forming dies 474 may be sized and configured complementary to the radius filler regions 140 of a composite structure 106. In this regard, each forming die 474 may have a die cavity 476 that may be contoured complementary to the radius filler region 140 of a composite structure 106 for forming each radius filler stack 210 into a final radius filler 206 having a variable cross-sectional shape 322 that substantially matches a radius filler region 140 (FIG. 20).

Figure 35:
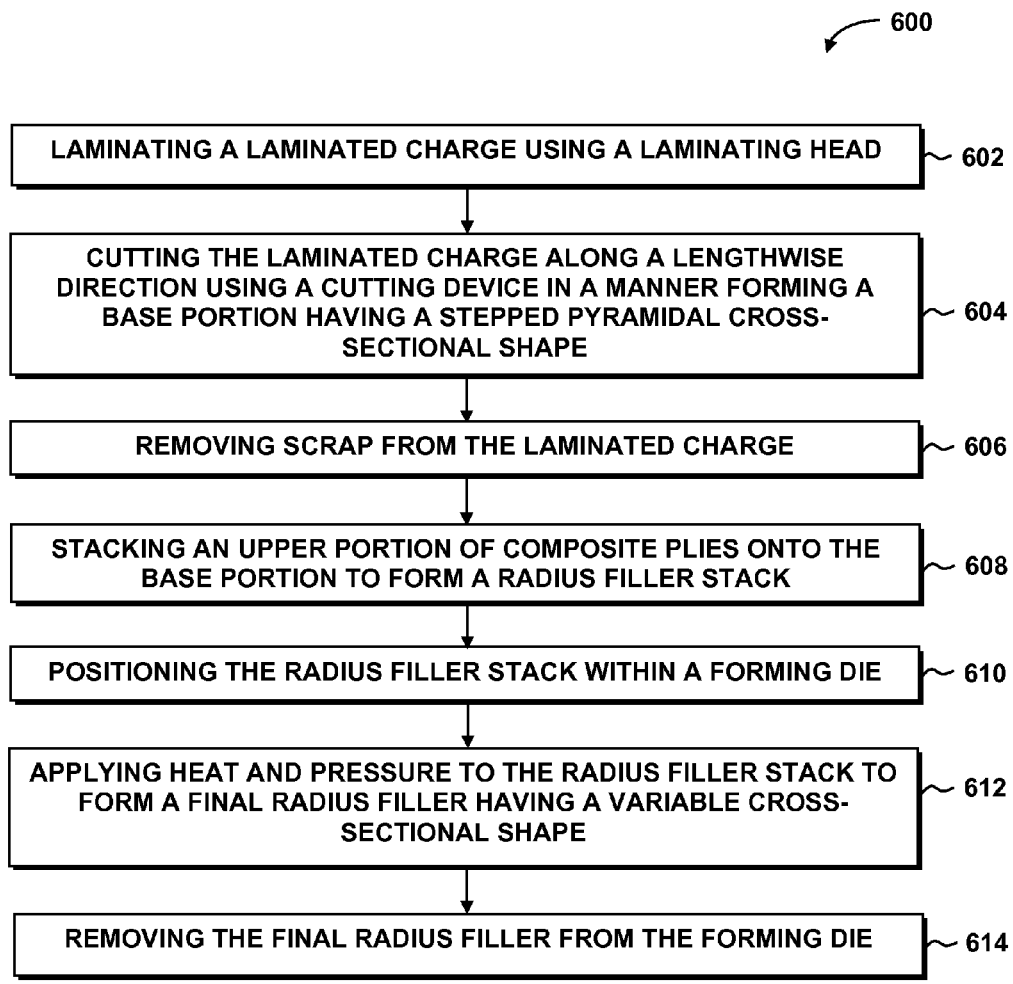
FIG. 35 is a flow diagram illustrating one or more operations that may be included in a method for automated manufacturing of one or more radius fillers.

FIG. 35 is a flowchart of a method 600 that may be implemented for automated manufacturing of one or more radius fillers 200 such as by using the system 400 illustrated in FIGS. 23-34 and described above. Step 602 of the method 600 may include assembling a laminated stack 422 onto a cutting table 416 such as the cutting table 416 illustrated in FIG. 23. As indicated above, a laminated stack 422 may comprise an individual multi-ply layer 272 (e.g., a laminated charge 270) or a stack of multi-ply layers 272. A laminated stack 422 may be formed by laminating a plurality of composite plies 276 or layers 272 onto the cutting table 416 using a laminating head 406 (FIG. 23).

Step 604 of the method 600 of FIG. 35 may include cutting the laminated stack 422 along a lengthwise direction using a cutting head 424. The cutting head 424 may cut individual multi-ply layers 272 or a stack of multi-ply layers 272. The individual multi-ply layers 272 may be used to form a base portion 320 having a stepped pyramidal cross-sectional shape 312 as illustrated in FIGS. 22-25. In this regard, the method may include passing a plurality of blades 432 (e.g., ultrasonic blades 434) of the cutting head 424 through a laminated stack 422 to ultrasonically cut the composite plies 276. The blades 432 may be arranged in a side-by-side configuration 430 and positioned at different heights and different lateral 438 positions relative to one another. The method may further include varying the lateral position of the blades 432 while passing the blades 432 through the laminated stack 422 along the lengthwise direction as shown in FIG. 27.

Step 606 of the method 600 of FIG. 35 may include removing scrap from the laminated stack 422. For example, the scrap (e.g., shown in cross-hath in FIG. 27) may be removed to expose the stepped pyramidal cross-sectional shape 312 of a base portion 320. The scrap may be removed during the cutting of the laminated stack 422. Alternately, the cutting head 424 may make several passes along the laminated stack 422 and the scrap may be removed following each pass.

Step 608 of the method 600 of FIG. 35 may be performed in the stacking station 446 and may include stacking individual multi-ply layers 272 to form a base portion 320 having a stepped pyramidal shape. An upper portion 212 of composite plies 276 may be stacked onto the base portion 320 to form the radius filler stack 210. As indicated above, after cutting the laminated stack 422 into individual multi-ply layers 272 or cutting the laminated stack 422 into a base portion 320, the cutting table 416 may be translated (e.g., rolled) into the stacking station 446 as shown in FIG. 23. A lifting mechanism 454 may be activated for stacking the individual multi-ply layers 272 to form a radius filler stack 210. The method may include picking up the base portion 320 using a vacuum-type lifting mechanism 454 such as a vacuum rail 456 having vacuum pads 458 as shown in FIGS. 30-32.

As shown in FIG. 29, the vacuum rail 456 may be laterally moved 464 or translated from the cutting table 416 over to a layup table 450. One or more layup tables 450 may be positioned alongside the cutting table 416 at the stacking station 446. The vacuum rail 456 may be indexed using an indexing device 460 for placement of the individual multi-ply layers 272 or placement of a cut base portion 320 into a desired location onto the layup table 450. The indexing device 460 may also facilitate the aligning of the upper portion 212 with the individual multi-ply layers 272 or the base portion 320. The method may further include stacking the upper portion 212 onto the base portion 320 using the vacuum rail 456 to form the radius filler stack 210 as shown in FIGS. 28-30. Although not shown, the method may include stacking the radius filler stack 210 in an inverted position such as in a fixture having a V-shape along a lengthwise direction.

Step 610 of the method 600 of FIG. 35 may include positioning the radius filler stack 210 within a forming die 474 located within a pressing station 466 as shown in FIGS. 30-31. In this regard, the radius filler stack 210 may be transferred from the stacking station 446 to the pressing station 466 by using a transporting fixture (not shown) for supporting the length of the radius filler stack 210. Alternatively, in an embodiment not shown, the pressing station 466 may be located adjacent to the stacking station 446 such that the lifting mechanism 454 may stack the base portion 320 and the upper portion 212 directly into the forming die 474.

Step 612 of the method 600 of FIG. 35 may include applying heat and pressure to the radius filler stack 210 to form a final radius filler 206 having a variable cross-sectional shape 322. FIGS. 33-34 illustrate a press 468 having a pair of forming dies 474 with die cavities 476 that may be shaped complementary to the filler radius regions of a composite structure 106. The press 468 may have a heat plate 470 for heating and softening the resin in the pre-preg composite plies 276 of the radius filler stacks 210. The press 468 may include actuators 472 in FIG. 33 to apply pressure to the heated and softened composite plies 276 such that the stepped pyramidal cross-sectional shape 312 of the radius filler stacks 210 is formed into a relatively smooth radius of the final radius filler 206.

Step 614 of the method 600 of FIG. 35 may include removing the final radius filler 206 from the forming die 474. It should be noted that in the present disclosure, the radius filler 200 may have radius filler sides 208 that are formed into a non-radial shape (e.g., a parabolic shape, an elliptical shape, rounded flats—not shown) on the opposing radius filler sides 208 (FIG. 4). In this regard, the radius filler 200 may be formed in any shape that substantially matches the shape or contour of a radius filler region of a composite structure 106.

Figure 36:
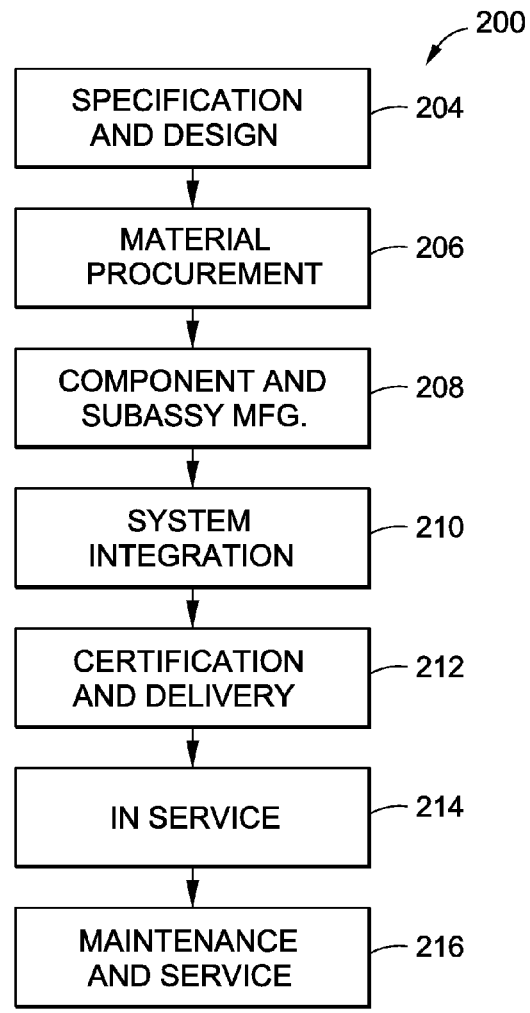
FIG. 36 is a flow diagram of an aircraft manufacturing and service methodology.
Figure 37:
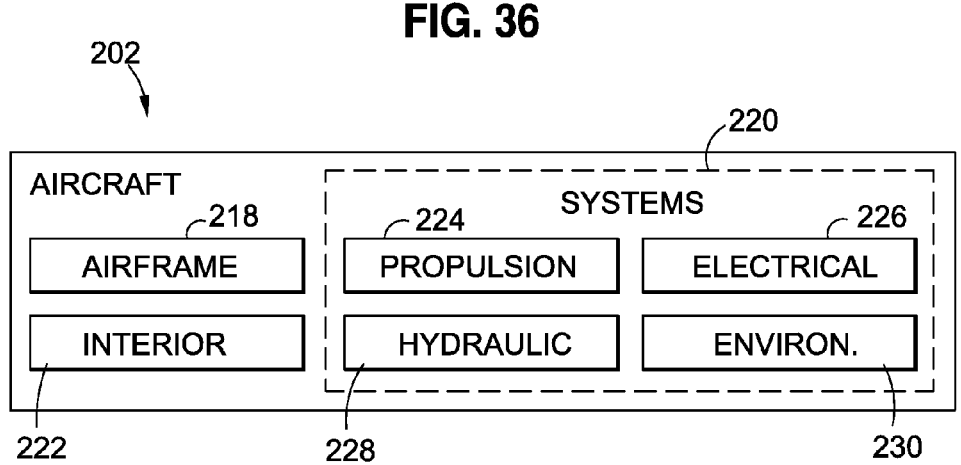
FIG. 37 is a block diagram of an aircraft.

Referring to FIGS. 36-37, embodiments of the disclosure may be described in the context of an aircraft manufacturing and service method 700 as shown in FIG. 36 and an aircraft 702 as shown in FIG. 37. During pre-production, exemplary method 700 may include specification and design 704 of the aircraft 702 and material procurement 706. During production, component and subassembly manufacturing 708 and system integration 710 of the aircraft 702 takes place. Thereafter, the aircraft 702 may go through certification and delivery 712 in order to be placed in service 714. While in service by a customer, the aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 37 the aircraft 702 produced by exemplary method 700 may include an airframe 718 with a plurality of systems 720 and an interior 722. Examples of high-level systems 720 include one or more of a propulsion system 724, an electrical system 726, a hydraulic system 728, and an environmental system 730. Any number of other systems may be included. Although an aerospace example is shown, the principles of the disclosed embodiments may be applied to other industries, such as the automotive industry.

The radius filler 200 and system and methods embodied herein may be employed during any one or more of the stages of the production and service method 700. For example, components or subassemblies corresponding to production process 708 may be fabricated or manufactured in a manner similar to components or subassemblies produced while the aircraft 702 is in service. Also, one or more radius filler 200 embodiments, system embodiment, method embodiments, or combinations thereof may be utilized during the production stages 708 and 710, for example, by substantially expediting assembly of or reducing the cost of an aircraft 702. Similarly, one or more of apparatus embodiments, method embodiments, or a combination thereof may be utilized while the aircraft 702 is in service, for example and without limitation, to maintenance and service 716.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A variable-radius laminated composite radius filler, comprising:
    a base portion formed of a plurality of variable width composite plies varying in overall width along an overall lengthwise direction and defining a variable cross-sectional shape of the base portion, the variable cross-sectional shape varying along the lengthwise direction, the length being longer than the width, the base portion includes one or more transition zones, each transition zone including:
    a plurality of composite plies changing width;
    a first composite ply changing in ply width within the transition zone along with a change in ply width of a second composite ply within the same transition zone;
    the change in ply width of the first composite ply has a first taper extending from the lengthwise edge of the start of the transition zone to the lengthwise edge of the end of the transition zone;
    the change in ply width of the second composite ply has a second taper extending from the lengthwise edge of the start of the transition zone to the lengthwise edge of the end of the transition zone;
    the angles of the first and second taper being substantially the same;
    at least one of a keyway portion and a tip portion stacked on top of the base portion;
    the keyway portion stacked on the base portion and being formed of a plurality of constant width composite plies defining a constant cross-sectional shape of the keyway portion, the constant cross-sectional shape being constant along the lengthwise direction; and
    the tip portion stacked on the base portion or the keyway portion and being formed of composite plies.

2. The radius filler of claim 1, wherein:
    at least one of the base portion and the keyway portion has a stepped pyramidal cross-sectional shape.

3. The radius filler of claim 1, wherein:
    at least one of the keyway portion and the base portion is formed as a stack of layers; and
    each one of the layers comprises a laminated charge containing a plurality of composite plies.

4. The radius filler of claim 3, wherein:
    each laminated charge in the keyway portion and the base portion is similar to one another and containing alternating +45 degree and −45 degree composite plies sandwiched between 0 degree composite plies on opposite sides of the 45 degree composite plies.

5. The radius filler of claim 1, wherein:
    the transition zone comprises a change in at least one of a base portion width and a base portion height in correspondence with at least one of a ply drop and a ply addition in a composite structure.

6. The radius filler of claim 5, wherein:
    the transition zone is offset from the at least one of the ply drop and the ply addition.

7. The radius filler of claim 5, wherein:
    the base portion is comprised of a top layer, a bottom layer, and one or more mid layers located between the top layer and the bottom layer; and
    the change in the base portion height comprises a termination of one of the mid layers.

8. The radius filler of claim 7, wherein:
    a terminating end of one of the mid layers has a non-square shape.

9. The radius filler of claim 7, wherein:
    the top layer is continuous along the lengthwise direction of the base portion.

10. The radius filler of claim 1, wherein:
    the base portion, the keyway portion and the tip portion comprise a radius filler stack; and
    the radius filler stack being formed into a final radius filler having opposing radius filler sides that are contoured complementary to stiffener outside radii of a composite structure.

11. The radius filler of claim 10, wherein:
    the composite structure has a stiffener inner radius that is constant along the lengthwise direction.

12. The radius filler of claim 1, wherein:
    the tip portion has a constant cross-sectional area and a variable cross-sectional shape.

13. The radius filler of claim 5, wherein:
    the base portion is comprised of a top layer, a bottom layer, and one or more mid layers located between the top layer and the bottom layer; and
    the change in the base portion height comprises a termination of a top layer.

14. The radius filler of claim 1, wherein:
    the radius filler has a variable-radius along a lengthwise direction.

15. The radius filler of claim 1, wherein:
    the keyway portion contains approximately 8 to 20 composite plies.

16. The radius filler of claim 1, wherein:
    the base portion contains approximately 20 to 52 composite plies.

17. The radius filler of claim 1, wherein:
    the keyway portion has as a keyway portion width of less than approximately 0.25 inch.

18. The radius filler of claim 1, wherein:
    the radius filler has opposing sides contoured complementary to a radius filler region of a composite structure;
    the base portion is configured such that opposing sides are configured complementary to a corresponding pair of stiffener outside radii of a pair of stiffeners defining a radius filler region along a lengthwise direction of the composite structure.

19. The radius filler of claim 1, wherein:
    the composite plies are carbon-fiber-reinforced pre-preg plies.

20. The radius filler of claim 1, wherein:
    the composite plies of the tip portion comprise a plurality of substantially constant width composite plies.

21. The radius filler of claim 1, wherein:
    the tip portion is formed of three composite plies.

22. The radius filler of claim 1, wherein:
    the composite plies of the tip portion are each approximately 0.25 inch wide.

23. The radius filler of claim 1, wherein:
the composite plies of the tip portion are carbon fiber reinforced plastic tape.

24. The radius filler of claim 1, wherein:
the composite plies of the tip portion have a thickness of approximately 0.0075 inch.

25. The radius filler of claim 1, wherein:
the tip portion has a maximum tip portion width of approximately 0.25 inch.

26. The radius filler of claim 1, wherein:
the tip portion has a tip portion height of approximately 0.023 inch.

27. The radius filler of claim 1, wherein:
the tip portion has a triangular cross-sectional shape.

28. The radius filler of claim 1, wherein:
the tip portion has a variable cross-sectional shape.

29. The radius filler of claim 28, wherein:
the tip portion has a width tip portion width that varies in correspondence with radii of a radius filler region of a composite structure.

30. The radius filler of claim 1, wherein:
the keyway portion has angled sides and defines a trapezoidal shape.

31. The radius filler of claim 1, wherein:
the keyway portion has a keyway portion height that is constant along a lengthwise direction.

32. The radius filler of claim 1, wherein:
the keyway portion has a maximum width of less than approximately 0.25 inch.

33. The radius filler of claim 1, wherein:
the tip portion and the keyway portion are formed as a unitary upper portion.

34. The radius filler of claim 3, wherein:
the layers in the keyway portion are manufactured from a laminated charge having the same composite material as the remaining layers of the keyway portion.

35. The radius filler of claim 7, wherein:
the top layer overlaps a terminating end of a mid layer.

36. The radius filler of claim 7, wherein:
the top layer has a stair-step shape formed by terminating ends of one or more mid layers.

37. The radius filler of claim 7, wherein:
the top layer has a top layer width that varies with at least one of ply drops and ply additions in a composite structure.

38. The radius filler of claim 8, wherein:
the terminating end of a mid layer has a generally pointed shape.

39. The radius filler of claim 8, wherein:
the terminating end of a mid layer has a generally rounded shape.

40. The radius filler of claim 1, wherein:
the base portion includes one or more constant zones comprising regions wherein the base portion has a relatively constant cross-sectional shape; and
the constant zones being separated by transition zones.

41. The radius filler of claim 6, wherein:
the transition zones are offset from the start of ply drops and ply additions by a distance of approximately 0.10-0.50 inch.

\* \* \* \* \*